United States Patent
Ikriannikov et al.

(10) Patent No.: US 11,869,695 B2
(45) Date of Patent: Jan. 9, 2024

(54) SWITCHING POWER CONVERTER ASSEMBLIES INCLUDING COUPLED INDUCTORS, AND ASSOCIATED METHODS

(71) Applicant: Maxim Integrated Products, Inc., San Jose, CA (US)

(72) Inventors: Alexandr Ikriannikov, San Jose, CA (US); Di Yao, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 153 days.

(21) Appl. No.: 17/451,632

(22) Filed: Oct. 20, 2021

(65) Prior Publication Data

US 2022/0158558 A1   May 19, 2022

Related U.S. Application Data

(60) Provisional application No. 63/113,675, filed on Nov. 13, 2020.

(51) Int. Cl.
| | |
|---|---|
| *H02M 1/00* | (2006.01) |
| *H02M 3/158* | (2006.01) |
| *H01F 17/04* | (2006.01) |
| *H01F 3/14* | (2006.01) |
| *H01F 38/02* | (2006.01) |

(52) U.S. Cl.
CPC ............ *H01F 17/04* (2013.01); *H01F 3/14* (2013.01); *H02M 1/0064* (2021.05); *H02M 3/1586* (2021.05); *H01F 2038/026* (2013.01)

(58) Field of Classification Search
CPC ............ H02M 1/0064; H02M 3/1584; H02M 3/1586; H01F 3/14; H01F 17/04; H01F 27/24; H01F 2038/026
See application file for complete search history.

(56) References Cited

U.S. PATENT DOCUMENTS

| | | | |
|---|---|---|---|
| 6,362,986 B1 * | 3/2002 | Schultz | H02M 3/158 363/132 |
| 7,352,269 B2 | 4/2008 | Li et al. | |

(Continued)

OTHER PUBLICATIONS

Jieli Li, et al., "Coupled-inductor design optimization for fast-response low-voltage DC-DC converters," APEC. Seventeenth Annual IEEE Applied Power Electronics Conference and Exposition (Cat. No. 02CH37335), Dallas, TX, 2002, pp. 817-823 vol. 2, doi: 10.1109/APEC.2002.989338 (Year: 2002).*

(Continued)

*Primary Examiner* — Fred E Finch, III
(74) *Attorney, Agent, or Firm* — PdZ Patent Law, PLLC

(57) ABSTRACT

A coupled inductor includes first and second magnetic rails, a plurality of connecting magnetic elements, and a plurality of windings. The first and second magnetic rails are separated from each other in a first direction, and the first magnetic rail has a first cross-sectional area A1 as seen when viewed in the first direction. Each connecting magnetic element is disposed between the first and second magnetic rails in the first direction. The plurality of connecting magnetic elements collectively have a second cross-sectional area A2 as seen when viewed in the first direction, and a ratio of A2/(A1−A2) is at least 1.5. A respective winding is wound at least partially around each connecting magnetic element.

20 Claims, 24 Drawing Sheets

(56) References Cited

U.S. PATENT DOCUMENTS

| | | | |
|---|---|---|---|
| 7,498,920 | B2 | 3/2009 | Sullivan et al. |
| 7,525,408 | B1 | 4/2009 | Li et al. |
| 7,746,209 | B1 | 6/2010 | Li et al. |
| 7,772,955 | B1 | 8/2010 | Li et al. |
| 7,864,016 | B1 | 1/2011 | Li et al. |
| 7,893,806 | B1 | 2/2011 | Li et al. |
| 7,898,379 | B1 | 3/2011 | Stratakos et al. |
| 7,936,244 | B2 * | 5/2011 | Hansen ............... H01F 27/346 336/200 |
| 8,102,233 | B2 | 1/2012 | Ikriannikov |
| 8,179,116 | B2 | 5/2012 | Wei et al. |
| 8,237,530 | B2 | 8/2012 | Ikriannikov |
| 8,350,658 | B1 | 1/2013 | Stratakos et al. |
| 8,847,722 | B2 | 9/2014 | Li et al. |
| 8,975,995 | B1 | 3/2015 | Ikriannikov |
| 9,019,063 | B2 | 4/2015 | Ikriannikov |
| 9,251,945 | B2 * | 2/2016 | Barthold ............... H01F 41/041 |
| 9,336,941 | B1 * | 5/2016 | Ikriannikov ............ H01F 27/29 |
| 9,373,438 | B1 | 6/2016 | Ikriannikov et al. |
| 9,721,719 | B1 | 8/2017 | Ikriannikov |
| 10,128,035 | B2 | 11/2018 | Yao et al. |
| 10,574,144 | B1 * | 2/2020 | Ramabhadran ......... H02M 1/14 |
| 2012/0319478 | A1 * | 12/2012 | Gentchev ............... H02M 1/14 323/361 |
| 2015/0213941 | A1 * | 7/2015 | Kuroda ................. H01F 37/00 336/212 |
| 2018/0323702 | A1 * | 11/2018 | Zhou ..................... H01F 27/38 |
| 2020/0312595 | A1 * | 10/2020 | Rippel ................. H01H 50/163 |

OTHER PUBLICATIONS

J. Czogalla, et al., "Automotive application of multi-phase coupled-inductor DC-DC converter," 38th IAS Annual Meeting on Conference Record of the Industry Applications Conference, 2003., Salt Lake City, UT, 2003, pp. 1524-1529 vol.3, doi: 10.1109/IAS.2003.1257758. (Year: 2003).*

P. Zumel, et al. "Magnetic integration for interleaved converters," Eighteenth Annual IEEE Applied Power Electronics Conference and Exposition, 2003. APEC '03., Miami Beach, FL, 2003, pp. 1143-1149 vol.2, doi: 10.1109/APEC.2003.1179360. (Year: 2003).*

Ursino et al., High Density 48V-to-POL VRM with Hybrid Pre-Regulator and Fixed-Ratio Buck, 2020 IEEE Applied Power Electronics Conference and Exposition (APEC), pp. 498-505, 2000.

Dong, Yan, Investigation of Multiphase Coupled-Inductor Buck Converters in Point-of-Load Applications, Dissertation, Virginia Polytechnic Institute and State University, 2009.

* cited by examiner

A2 = AC1 + AC2 + AC3

(Leakage Flux)

(Leakage Flux)

(Magnetizing Flux)

(Magnetizing Flux)

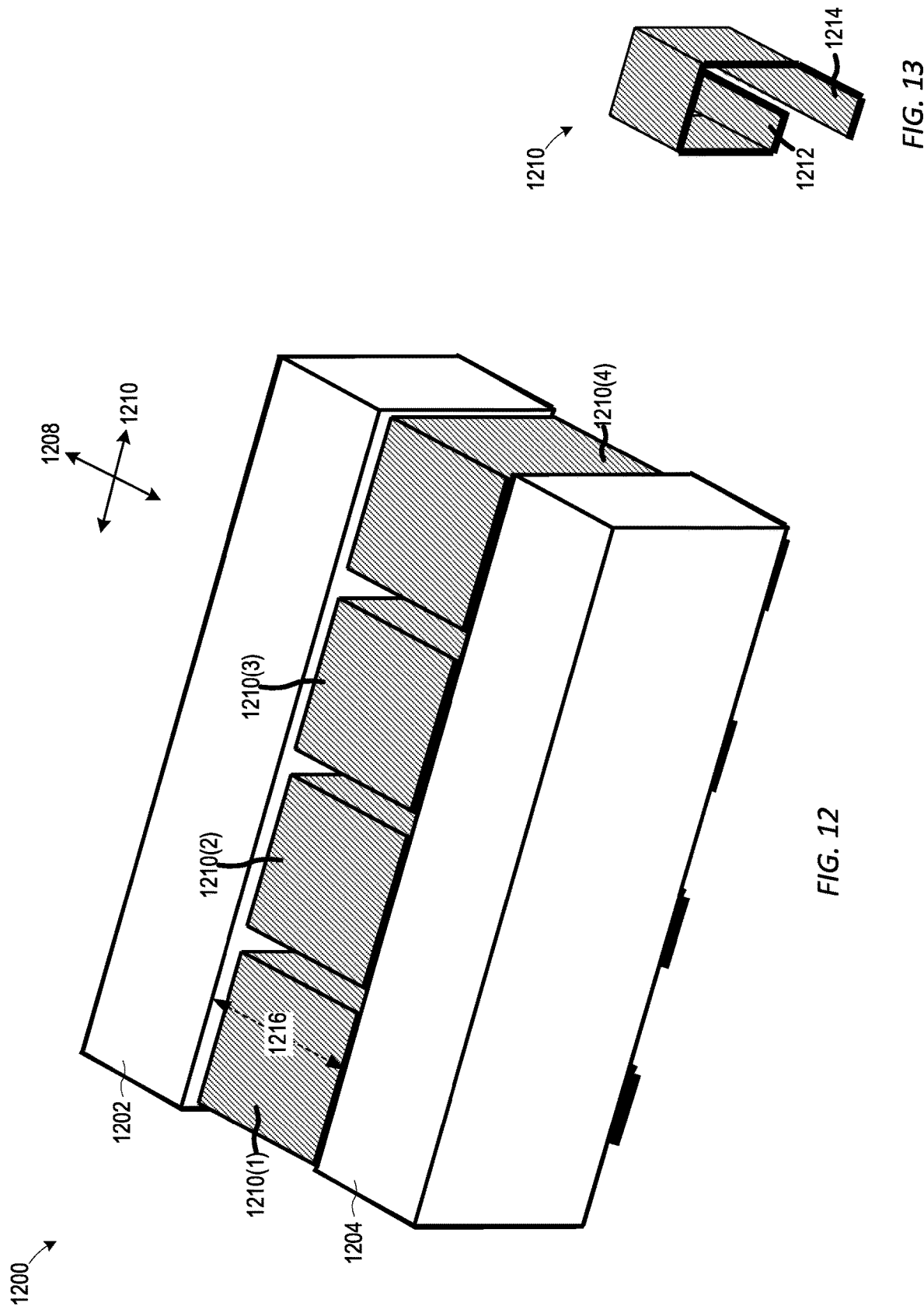

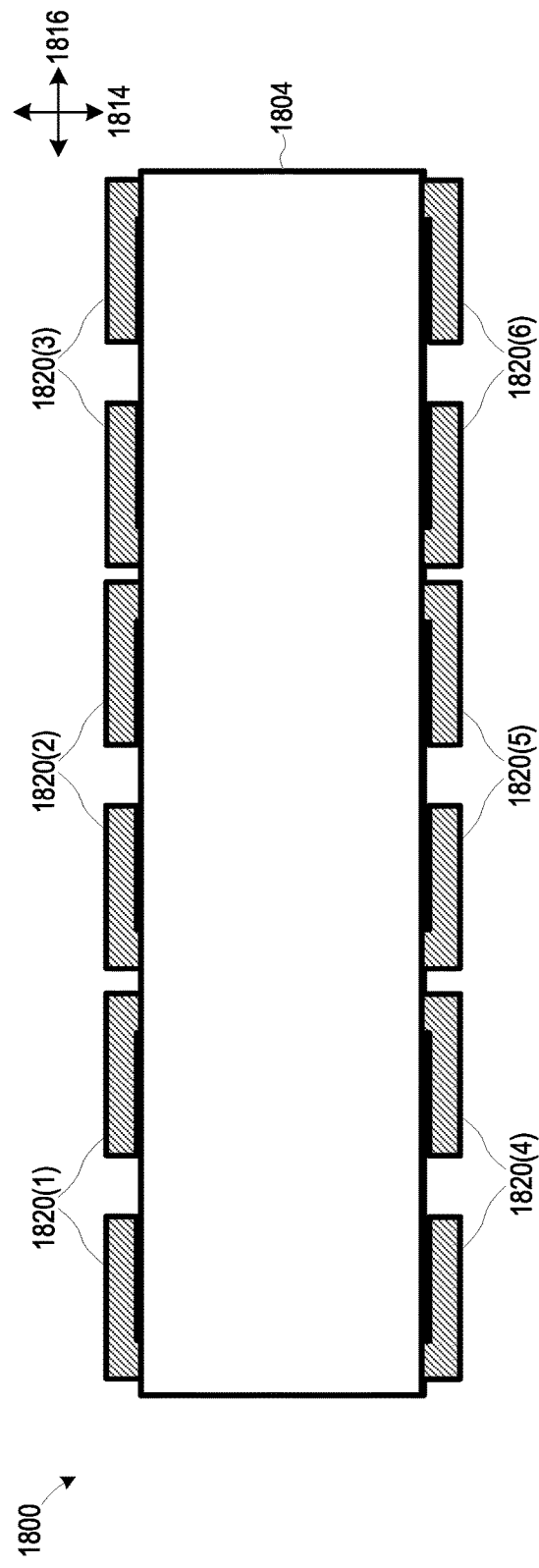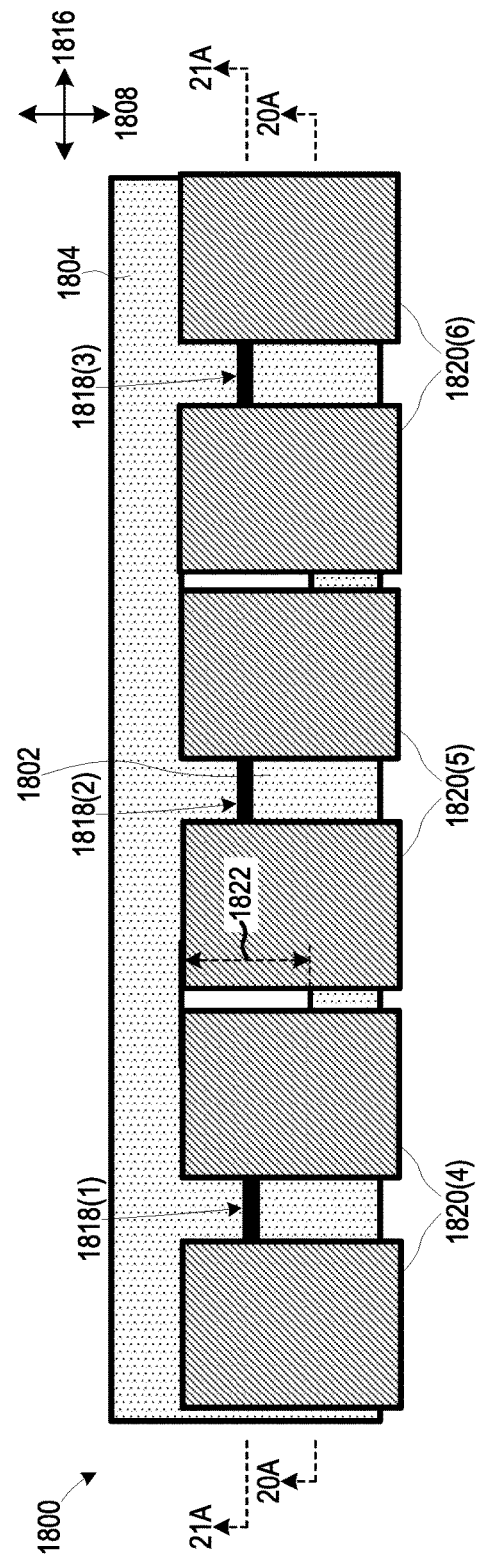

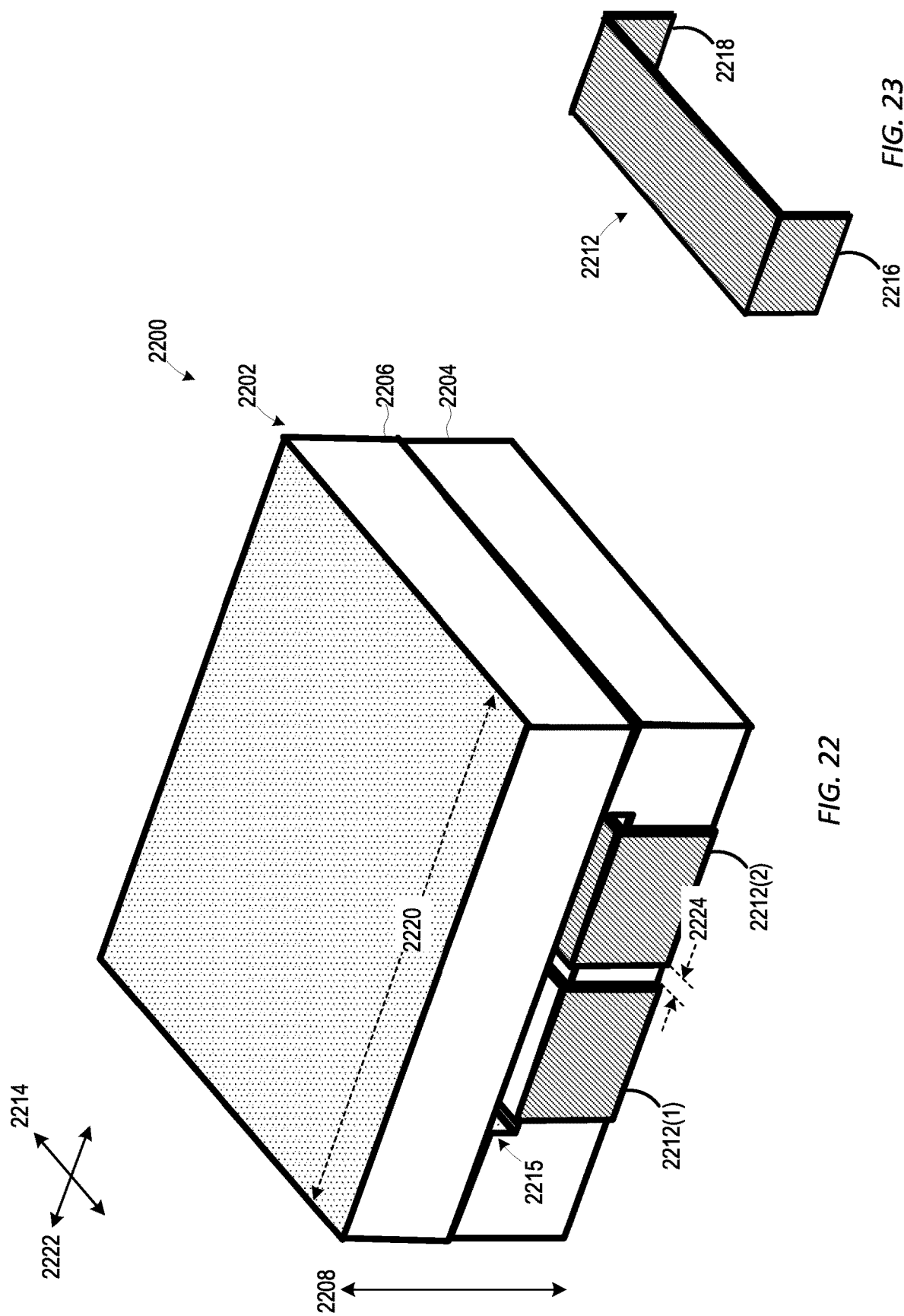

SWITCHING POWER CONVERTER ASSEMBLIES INCLUDING COUPLED INDUCTORS, AND ASSOCIATED METHODS

RELATED APPLICATIONS

This application claims benefit of priority to U.S. Provisional Patent Application Ser. No. 63/113,675, filed on Nov. 13, 2020, which is incorporated herein by reference.

BACKGROUND

A coupled inductor is an electromagnetic device including two or more windings that are magnetically coupled together. A coupled inductor is designed to exhibit both leakage inductance ($L_k$) and magnetizing inductance ($L_m$). Leakage inductance results from magnetic flux generated by current flowing through a winding of the coupled inductor which does not couple to any other winding of the coupled inductor. Thus, leakage inductance is associated with energy storage in the coupled inductor. Magnetizing inductance results from magnetic flux generated by current flowing through one winding of the coupled inductor which couples to each other winding of the coupled inductor. Thus, magnetizing inductance is associated with magnetic coupling of the windings. Coupled inductors are frequently used in multi-phase switching power converters, such as in a multi-phase buck converter, a multi-phase boost converter, or a multi-phase buck-boost converter, for energy storage and to achieve advantageous coupling of the converter phases.

BRIEF DESCRIPTION OF THE DRAWINGS

FIG. 12 is a perspective view of another coupled inductor with a high coupling coefficient, according to an embodiment.

FIG. 13 is a perspective view of a winding of the FIG. 12 coupled inductor.

FIG. 18 is a top plan view of another coupled inductor having a high coupling coefficient, according to an embodiment.

FIG. 19 is a front elevational view of the FIG. 18 coupled inductor.

FIG. 22 is a perspective view of a two-phase coupled inductor with a high coupling coefficient, according to an embodiment.

FIG. 23 is a perspective view of a winding of the FIG. 22 coupled inductor.

DETAILED DESCRIPTION OF THE EMBODIMENTS

Use of a coupled inductor, instead of multiple discrete (uncoupled) inductors, in a multi-phase switching power converter may achieve significant advantages. For example, a switching power converter including a coupled inductor will exhibit significantly better transient response than an otherwise similar switching power converter including multiple discrete inductors in place of the coupled inductor. As another example, a switching power converter including a coupled inductor will exhibit significantly lower ripple current magnitude than an otherwise similar switching power converter including multiple discrete inductors in place of the coupled inductor. Consequently, use of a coupled inductor in a switching power converter promotes high switching power converter performance. Additionally, a coupled inductor can be used in a switching power converter to achieve high efficiency by enabling the switching power converter to operate at a lower switching frequency than a comparable switching power converter including discrete inductors, while exhibiting comparable transient performance to the power converter including discrete inductors.

A coupled inductor can be characterized by a coupling coefficient ρ which is a ratio of the coupled inductor's magnetizing inductance to the coupled inductor's leakage inductance, i.e. $\rho = L_m/L_k$. It is generally desirable that coupling coefficient ρ be large to realize benefits of using a coupled inductor instead of multiple discrete inductors, such as ability to reduce ripple current magnitude at a given transient response. For example, EQN. 1 expresses ripple current ΔI in a multi-phase buck switching power converter including N phases and a coupled inductor as a function of input voltage $V_{in}$, output voltage $V_o$, coupled inductor leakage inductance $L_k$, converter duty cycle D, converter switching frequency $F_s$, and a figure of merit FOM.

$$\Delta I = \frac{V_{in} - V_o}{L_k} \cdot D \cdot \frac{1}{F_s} \cdot \frac{1}{FOM} \quad \text{(EQN. 1)}$$

Figure 1:
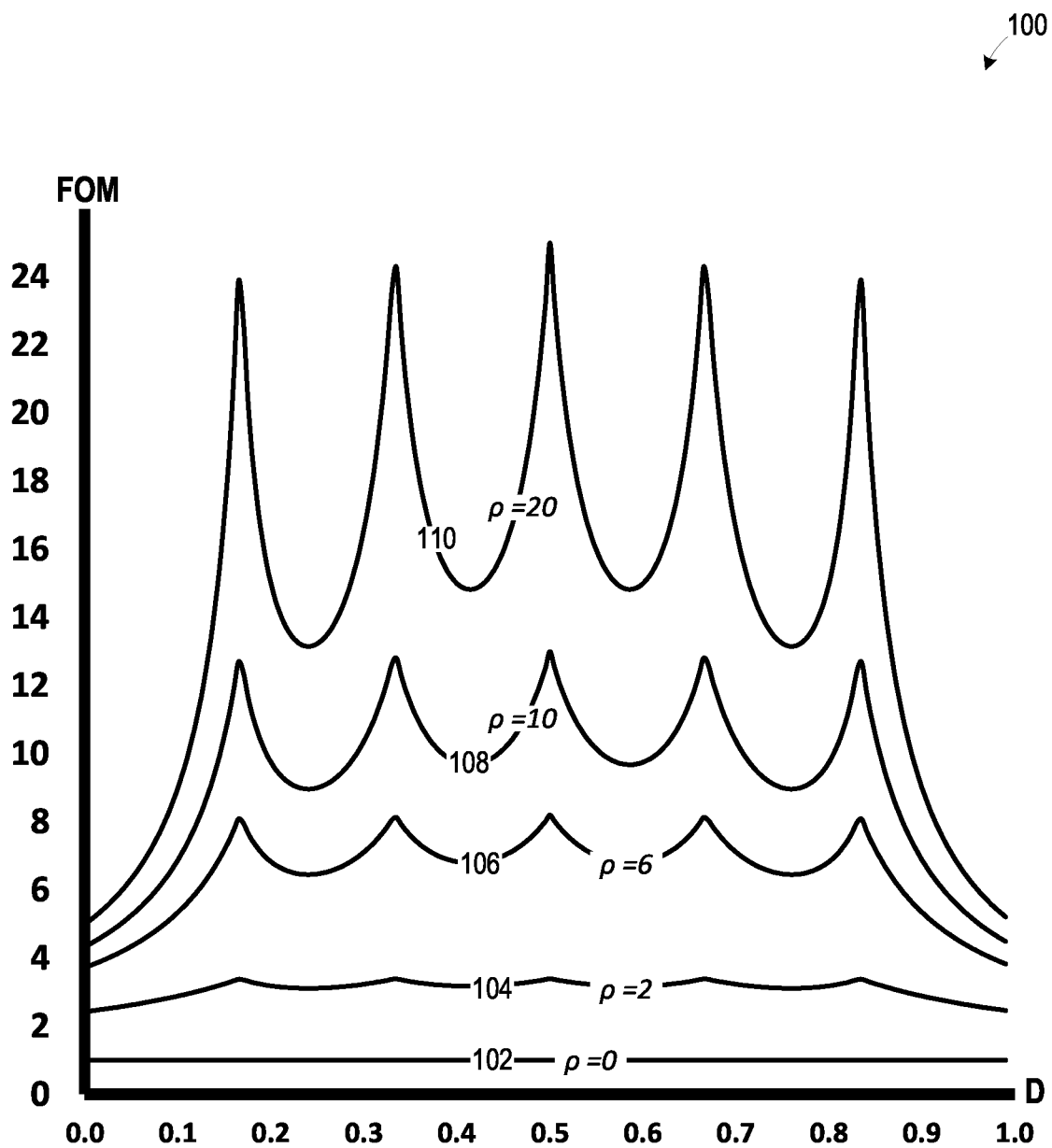
FIG. 1 is a graph of simulated figure of merit versus switching power converter duty cycle for a six-phase buck converter, at several different coupling coefficient values.

Figure of merit FOM in EQN. 1 represents how much leakage inductance $L_k$, or switching frequency $F_s$, can be reduced by use of a coupled inductor instead of multiple discrete inductors, at a given ripple current magnitude. While figure of merit FOM is a function of several parameters including coupling coefficient ρ, figure of merit FOM generally increases with increasing coupling coefficient ρ. For example, FIG. 1 is a graph of simulated figure of merit FOM versus converter duty cycle D for a six-phase buck switching power converter at several different values of coupling coefficient ρ. Curves 102, 104, 106, 108, and 110 correspond to coupling coefficient ρ values of 1, 2, 6, 10, and 20, respectively. As evident from FIG. 1, dramatic increases in figure of merit FOM can be achieved by raising coupling coefficient ρ, especially at certain duty cycles. Large values of figure of merit FOM, in turn, enable reduction in leakage inductance (and corresponding improvement in transient response), and/or decrease in switching frequency (and corresponding increase in efficiency), as discussed above. Accordingly, coupled inductor performance generally increases with increasing FOM, and a large figure of merit FOM is clearly desirable in switching power converter applications of a coupled inductor.

However, it can be difficult to achieve a high figure of merit FOM with a conventional coupled inductor. For example, magnetizing inductance $L_m$ value may be limited by available magnetic core cross section, as well as requisite saturation current rating to ensure reliable switching power converter operation under all anticipated operating conditions, such as during large changes in switching power converter load.

Disclosed herein are coupled inductors with high coupling coefficients which are advantageously capable of achieving a significantly higher figure of merit FOM than conventional coupled inductors. Certain embodiments of the new coupled inductors include a magnetic core that is free of leakage structures, thereby significantly lowering leakage inductance $L_k$ that directly improves transient performance, which also results in a corresponding increase in coupling coefficient ρ and large figure of merit FOM. While a decrease in leakage inductance $L_k$ will, in itself, increase ripple current magnitude, the associated ripple current increase is partially, or even completely, offset by the corresponding increase in coupling coefficient ρ. Additionally, the lack of leakage structures in the magnetic core helps achieve a high leakage inductance saturation current rating due to an effectively large gap for the remaining leakage paths in the magnetic structure. Furthermore, the lack of leakage structures helps maximize magnetic core volume available for coupling magnetic flux and magnetizing inductance $L_m$, which results in a proportional increase in coupling coefficient ρ, as well as a high magnetizing inductance saturation current rating, at a given magnetic core volume.

Moreover, the magnetic core configurations of the new coupled inductors promote manufacturability, robustness, and low cost. Specifically, conventional coupled inductors include leakage structures which may be difficult to manufacture and are relatively fragile, thereby resulting in low yield and high cost. The new coupled inductors with magnetic cores that are free of leakage structures do not have these drawbacks, and the new coupled inductors may therefore be cheaper and easier to manufacture than conventional coupled inductors. Additionally, the new coupled inductors are more conducive to low-height applications than conventional coupled inductors because they are free of magnetic core leakage structures which are difficult to manufacture in long and thin pieces, as typically required in low-height applications.

Figure 2:
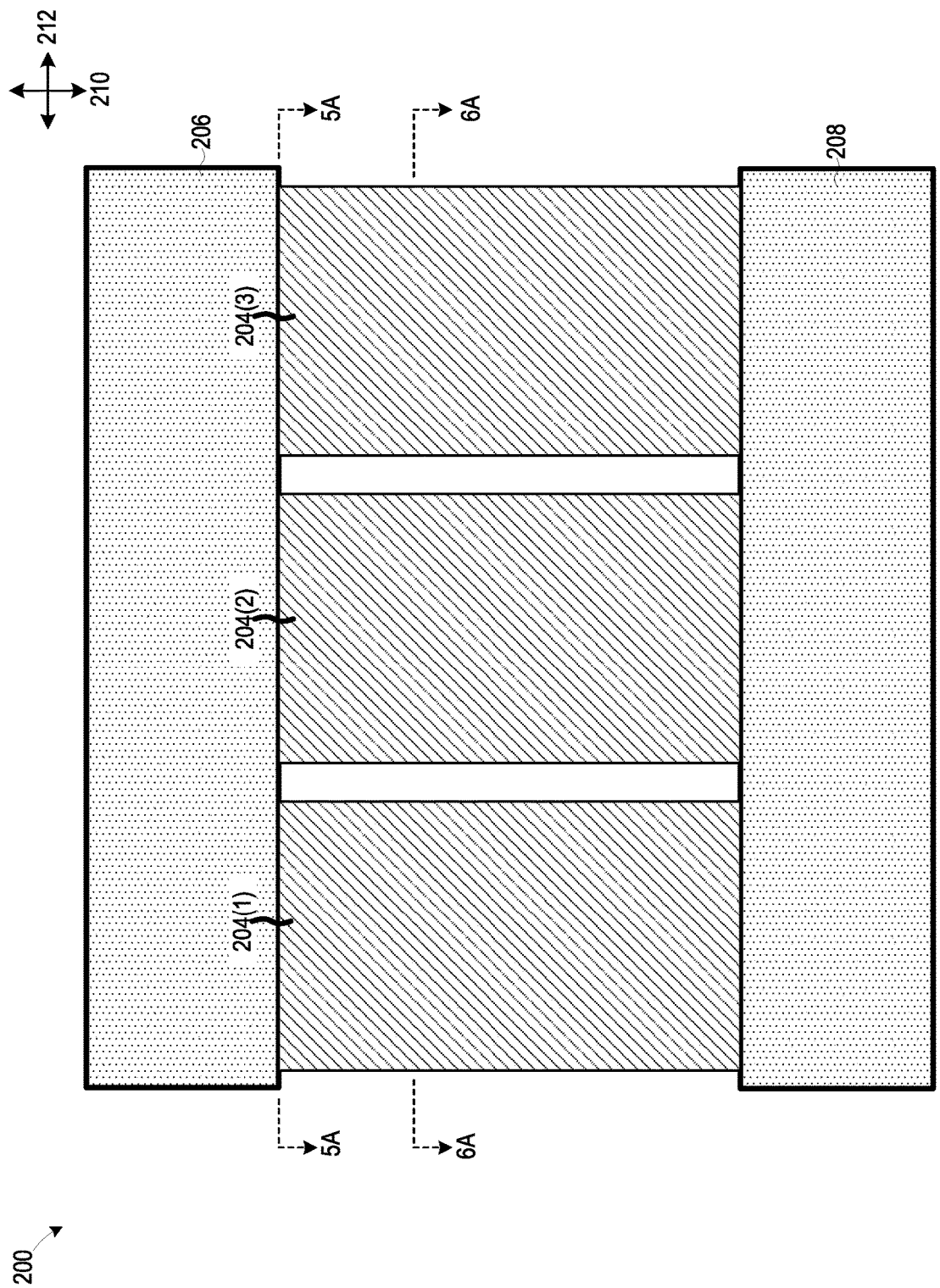
FIG. 2 is a top plan view of a coupled inductor with a high coupling coefficient, according to an embodiment.
Figure 3:
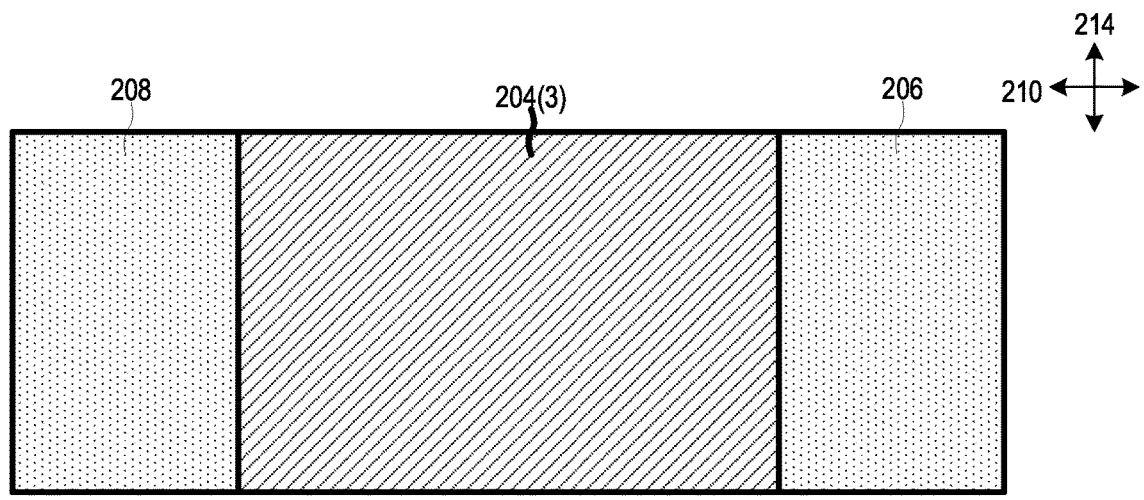
FIG. 3 is a side elevational view of the FIG. 2 coupled inductor.
Figure 4:
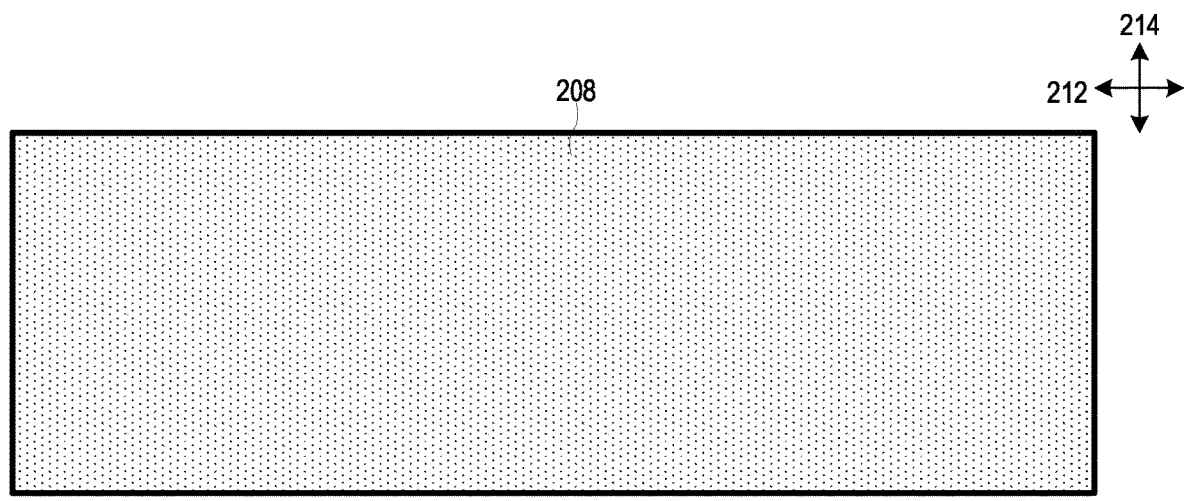
FIG. 4 is a front elevational view of the FIG. 2 coupled inductor.
Figure 5:
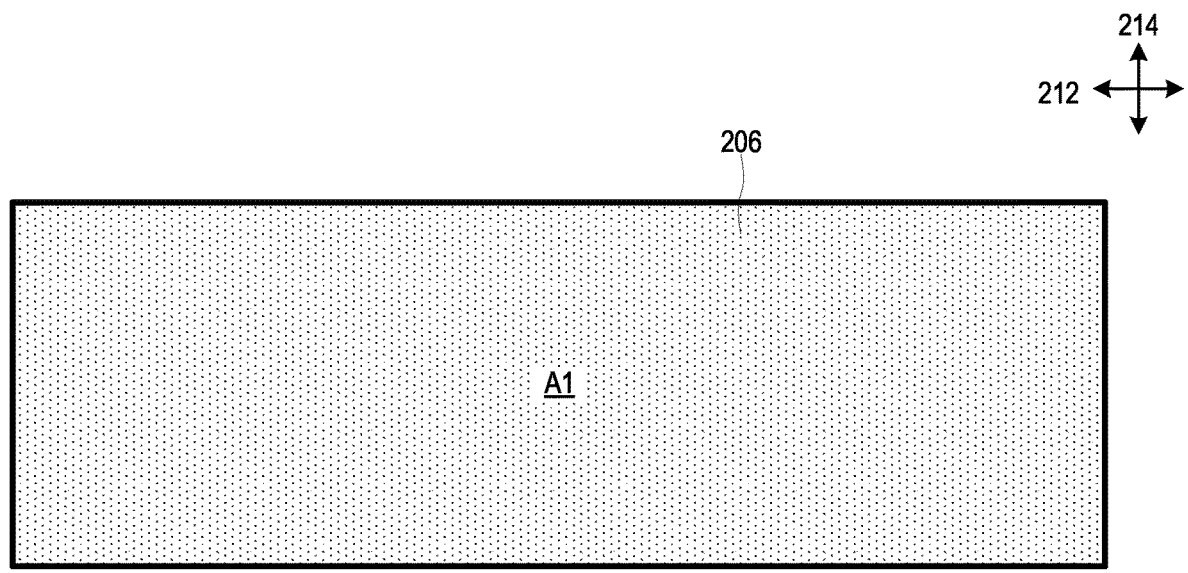
FIG. 5 is cross-sectional view of the FIG. 2 coupled inductor taken along line 5A-5A of FIG. 2.
Figure 6:
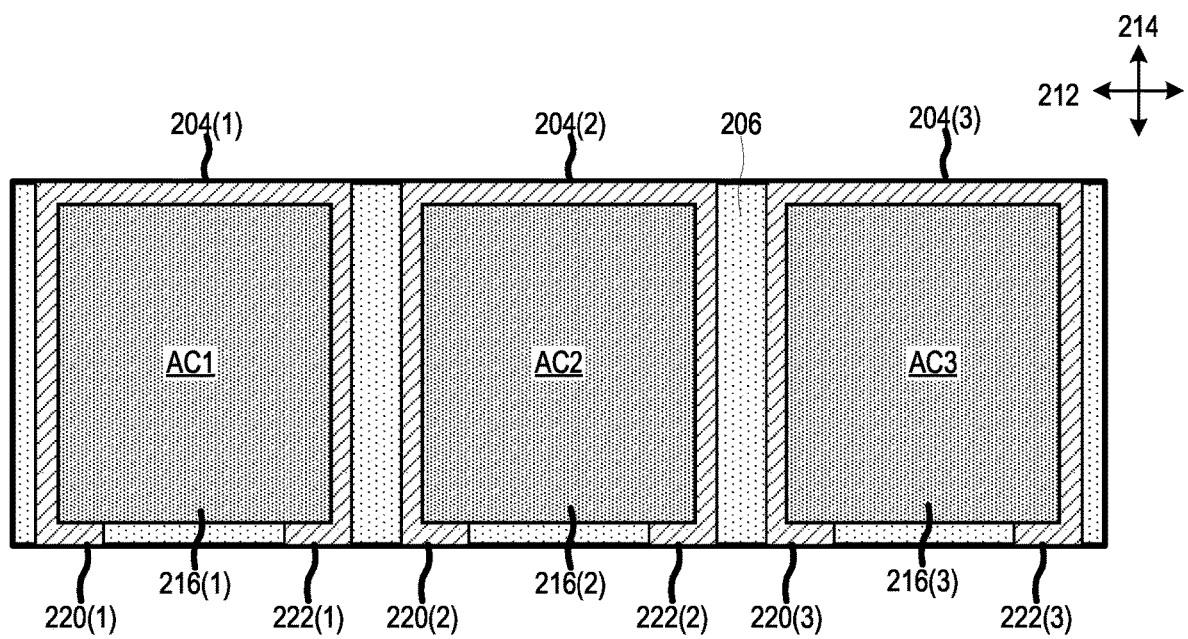
FIG. 6 is a cross-sectional view of the FIG. 2 coupled inductor taken along line 6A-6A of FIG. 2.

FIG. 2 is a top plan view of a coupled inductor 200, which is one embodiment of the new coupled inductors with a high coupling coefficient. FIG. 3 is a side elevational view of coupled inductor 200, FIG. 4 is a front elevational view of coupled inductor 200, FIG. 5 is cross-sectional view of coupled inductor 200 taken along line 5A-5A of FIG. 2, and FIG. 6 is a cross-sectional view of coupled inductor 200 taken along line 6A-6A of FIG. 2. FIGS. 2-6 are best viewed together in the following description.

Figure 7:
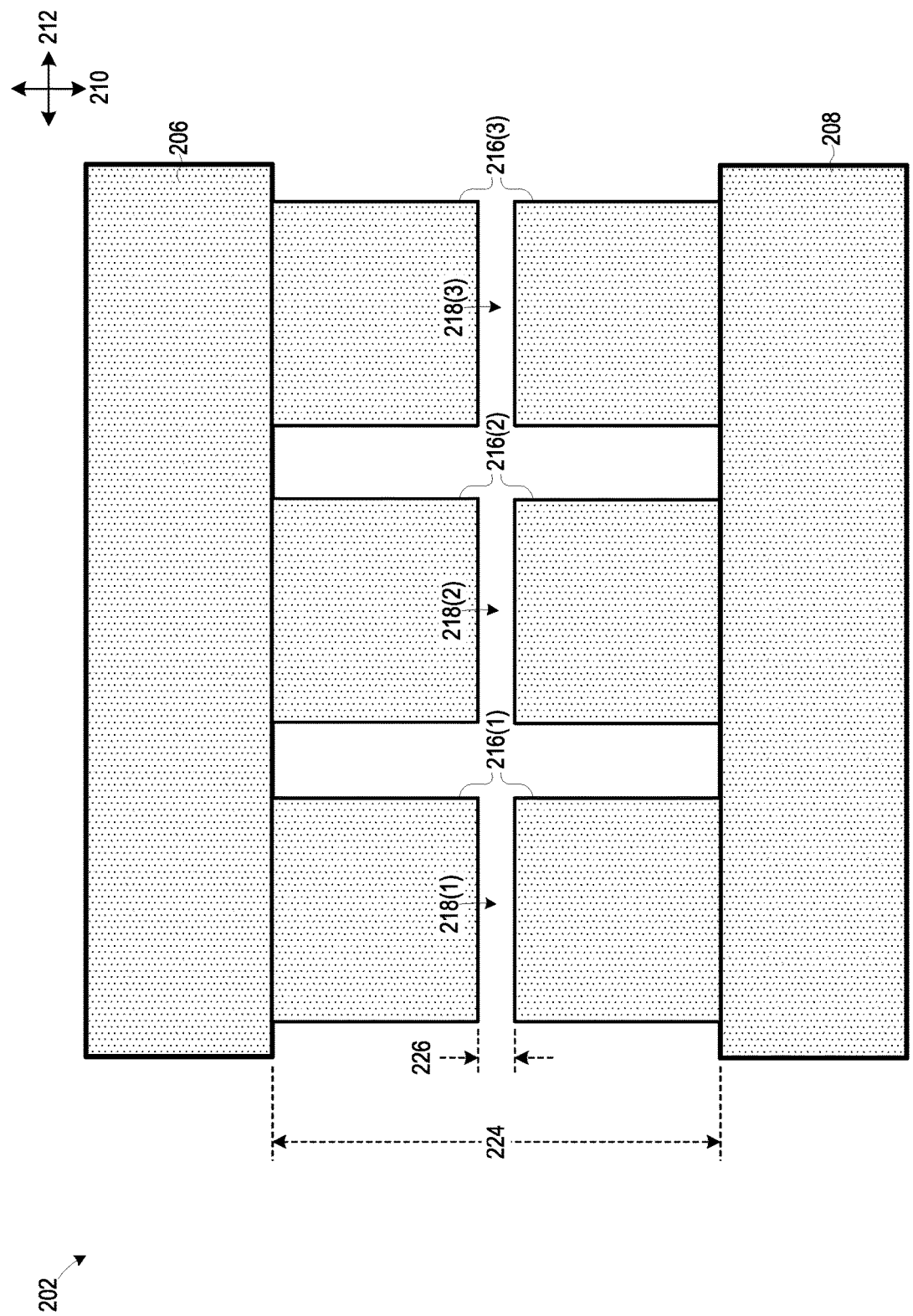
FIG. 7 is a top plan view of a magnetic core of the FIG. 2 coupled inductor.

Coupled inductor 200 includes a magnetic core 202 and a plurality of windings 204. In this document, specific instances of an item may be referred to by use of a numeral in parentheses (e.g. winding 204(1)) while numerals without parentheses refer to any such item (e.g. windings 204). FIG. 7 is top plan view of magnetic core 202, i.e. without windings 204, to further show features of magnetic core 202. Magnetic core 202 includes a first magnetic rail 206 and a second magnetic rail 208 that are separated from each other in a direction 210. Direction 210 is orthogonal to each of a direction 212 and a direction 214 that are shown in the present figures. Magnetic core 202 further includes a plurality of connecting magnetic elements 216 that are separated from each other in direction 212 that is orthogonal to each of directions 210 and 214. Each connecting magnetic element 216 is disposed between the first and second magnetic rails 206 and 208 in direction 210. Each connecting magnetic element 216 optionally forms one or more gaps 218 in direction 210, such as illustrated in FIG. 7. Gaps 218 are filed, for example, with air, adhesive, plastic, paper, and/or magnetic material having a lower permeability than magnetic material forming connecting magnetic elements 216. While gaps 218 are illustrated in FIG. 7 as being in the middle of connecting magnetic elements 216 in direction 210, gaps 218 could be located in other portions of connecting magnetic elements 216 without departing from the scope hereof.

Magnetic core 202 may be either a homogenous magnetic core formed of a single magnetic material (e.g. a ferrite magnetic material) or a composite magnetic core formed of two or more different magnetic materials (e.g. a ferrite magnetic material and an iron powder magnetic material). The lines separating various portions of magnetic core 202 in FIG. 7 need not represent discontinuities in the magnetic core, as these lines are present merely to help a viewer distinguish the various elements of magnetic core 202.

A respective winding 204 is at least partially would around each connecting magnetic element 216 (see, e.g. FIGS. 2 and 6). Each winding has respective ends 220 and 222 forming solder tabs, as shown in FIG. 6. Although windings 204 are depicted as being single-turn metallic foil windings, such as copper foil windings, windings 204 could have other configurations without departing from the scope hereof. For example, windings 204 could instead be single wire windings, such as having a round cross section, a rectangular cross-section, or a rounded-rectangular cross-section, or windings 204 could be Litz wire windings. As another example, windings 204 could form multiple turns, and windings 204 could have a different type of termination, such as through-hole posts instead of solder tabs. Additionally, windings 204 could be insulated windings. Moreover, each winding 204 need not have the same configuration. Although coupled inductor 200 is illustrated with space between adjacent windings 204 being free of tangible material, or in other words, being filled with air, space between windings 204 could be filled with another material, such as adhesive, plastic, paper, and/or magnetic material having a lower permeability than magnetic material forming connecting magnetic elements 216.

The configuration of magnetic core 202 advantageously helps achieve both a large coupling coefficient and high saturation current ratings. For example, first magnetic rail 206 has a first cross-sectional area A1 as seen when viewed in direction 210, as shown in the FIG. 5 cross-sectional view. Additionally, connecting magnetic elements 216 have a collective cross-sectional area A2 as seen when viewed in direction 210, as shown in the FIG. 6 cross-sectional view. In particular, connecting magnetic elements 216(1)-216(3) have respective cross-sectional areas AC1-AC3, and the sum of these cross-sectional areas is A2, as shown in FIG. 6. Magnetic core 202 is free of leakage structures which enables some embodiments of coupled inductor 200 to have a ratio of A1/(A1−A2) that is at least 1.5. Applicant has found that maximizing the ratio of A1/(A1−A2) helps achieve (1) a large value of $L_m$, (2) a small value of $L_k$, and (3) a large product of $L_m$ and $L_{sat\_Lm}$, where $L_{sat\_Lm}$ is a saturation current rating of the $L_m$ of coupled inductor 200. Thus, having a large ratio of A1/(A1−A2) helps achieve significant resistance to magnetic saturation, as well as a large coupling coefficient. In contrast, if a large coupling coefficient where instead obtained with a small ratio of A1/(A1−A2) by configuring connecting magnetic elements 216 to have minimal or no gaps 218 to increase $L_m$, a product of $L_m$ and $L_{sat\_Lm}$ would be small, and the coupled inductor would therefore be prone to magnetic saturation. In embodiments where cross-sectional areas are non-uniform along direction 210, the cross-sectional areas considered in the ratio of A1/(A1−A2) are the smallest cross-sectional areas along direction 210.

Figure 8:
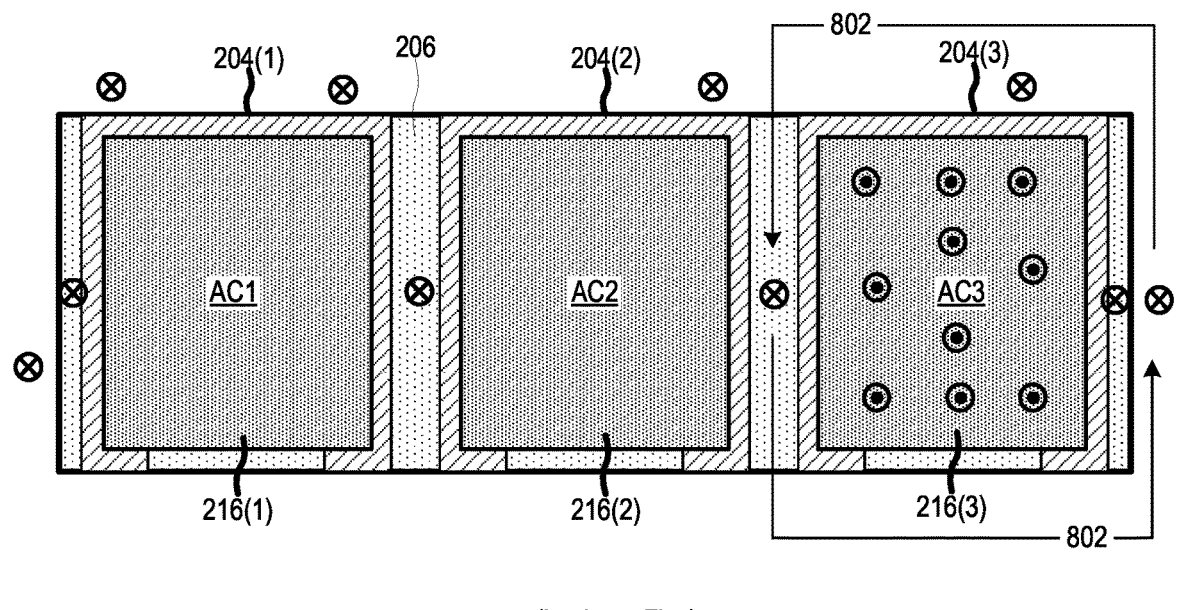
FIG. 8 is a cross-sectional view of the FIG. 2 coupled inductor that is marked-up to illustrate leakage magnetic flux flow.

FIGS. 8-11 collectively illustrate one example of how a large ratio of A1/(A1−A2) helps achieve a large value of magnetizing inductance $L_m$ and a small value of leakage inductance $L_k$. In particular, FIG. 8 is a cross-sectional view of coupled inductor 200 that is marked up to illustrate leakage magnetic flux associated with winding 204(3). Dots within a circle represent magnetic flux flowing out of the page, and the letter "X" within a circle represent magnetic flux flowing into the page. The FIG. 8 illustration assumes that current is flowing through winding 204(3) in a counter-clockwise direction, as symbolically shown by arrows 802 in FIG. 8. If current flow direction is reversed, magnetic flux flow direction will also be reversed, i.e., magnetic flux inside of winding 204(3) will flow into the page of FIG. 8, and magnetic flux outside of the winding will flow out of the page of FIG. 8. As shown in the FIG. 8 illustration, the majority of leakage magnetic flux associated with winding 204(3) flows through first magnetic rail 206 when outside of connecting magnetic element 216(3), due to the large magnetic permeability of first magnetic rail 206 compared to air. However, the large value of A1/(A1−A2) limits available area for leakage magnetic flux to flow between first magnetic rail 206 and second magnetic rail 208. As a result, leakage inductance $L_k$ is relatively small for coupled inductor 200.

Figure 9:
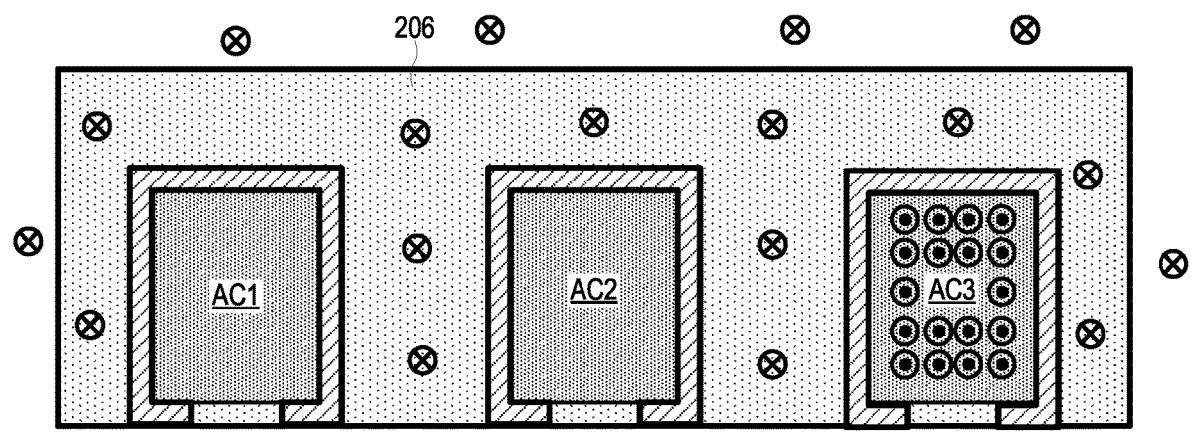
FIG. 9 is a cross-sectional view of a modified coupled inductor that is marked-up to illustrate leakage magnetic flux flow.

FIG. 9, in contrast, is a cross-sectional view of a coupled inductor that is similar to coupled inductor 200 but is modified so that A1/(A1−A2) is less than 1.5. As a result, there is significant area for leakage magnetic flux to flow between first magnetic rail 206 and second magnetic rail 208, which results in significant leakage magnetic flux flow, as illustrated in FIG. 9. Consequently, the coupled inductor of FIG. 9 will have a significantly lower ratio of $L_m/L_k$ because of the greater area for the leakage inductance $L_k$ flux than coupled inductor 200. FIG. 9 assumes that current is flowing through the right-most winding in a counter-clockwise direction, analogous to the direction of current flowing through winding 204(3) of FIG. 8.

Figure 10:
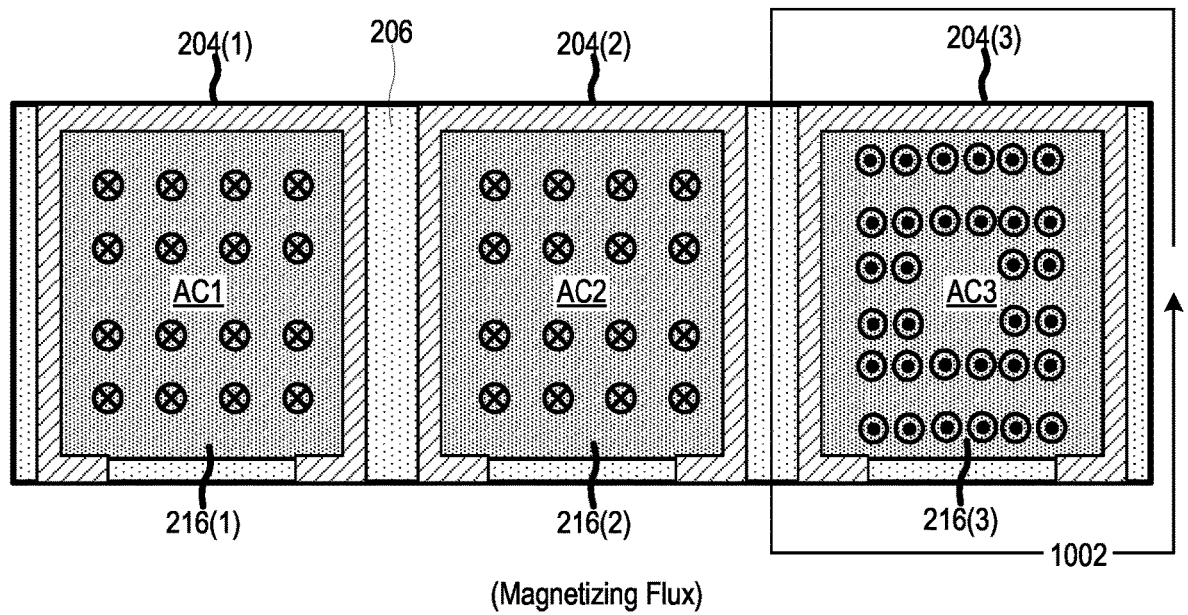
FIG. 10 is a cross-sectional view of the FIG. 2 coupled inductor that is marked-up to illustrate magnetizing magnetic flux flow.

FIG. 10 is a cross-sectional view of coupled inductor 200 that is marked up to illustrate magnetizing magnetic flux associated with winding 204(3). FIG. 10 again assumes that current is flowing through winding 204(3) in a counter-clockwise direction, as symbolically shown by arrow 1002 in FIG. 10. If current flow direction is reversed, magnetic flux flow direction will also be reversed. For example, magnetic flux within winding 204(3) will flow into the page of FIG. 10, instead of out of the page of FIG. 10, if direction of current flow through winding 204(3) is reversed. The large value of A1/(A1−A2) provides a large low reluctance path for magnetizing flux, relative to the volume of magnetic core 202. Consequently, a large amount of magnetizing magnetic flux flows within magnetic core 202, as illustrated in FIG. 10, resulting in a large magnetizing inductance $L_m$ value.

Figure 11:
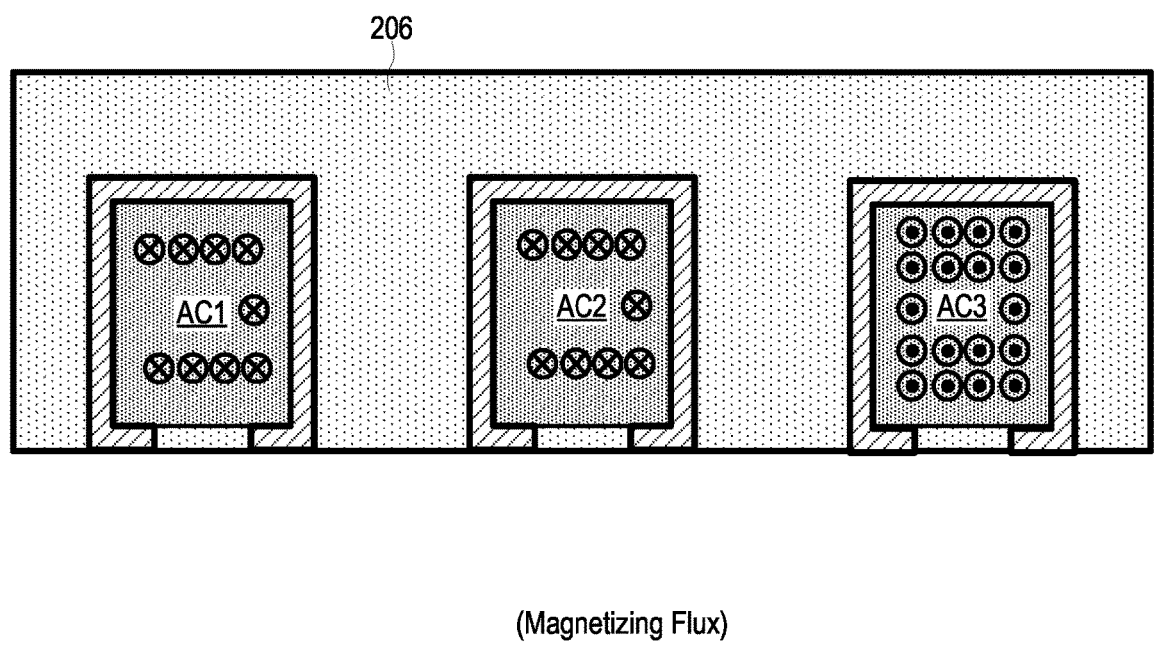
FIG. 11 is a cross-sectional view of a modified coupled inductor that is marked-up to illustrate magnetizing magnetic flux flow.

FIG. 11, on the other hand, is a cross-sectional view of a coupled inductor that is similar to coupled inductor 200 but is modified so that A1/(A1−A2) is less than 1.5. As a result, magnetizing magnetic flux path reluctance is significantly higher than that of FIG. 10 for the same gap size in areas AC1-AC3, resulting is significantly less magnetizing magnetic flux flow, as illustrated in FIG. 11. Consequently, the FIG. 11 coupled inductor will have smaller magnetizing inductance $L_m$ value than the FIG. 10 coupled inductor. FIG. 11 assumes that current is flowing through the right-most winding in a counter-clockwise direction, analogous to the direction of current flowing through winding 204(3) of FIG. 10.

Referring again to FIG. 7, in some embodiments, a thickness 226 of gaps 218 in direction 210 is at least twice (two times) smaller than a separation distance 224 between first rail 206 and second rail 208 in direction 210 (FIG. 7). This relationship further helps achieve a large value of $L_m$, which additionally promotes a large coupling coefficient value, in conjunction with the ratio of A1/(A1−A2) being at least 1.5. Moreover, the ratio of A1/(A1−A2) could be greater than 1.5, e.g. at least 2.0, 2.5, 3.0, or 3.5, to achieve an even larger coupling coefficient along with a large product of $L_m$ and $I_{sat}$.

Modifications may be made to coupled inductor 200 without departing from the scope hereof. For example, while coupled inductor 200 is a three-phase coupled inductor, i.e.

it includes three connecting magnetic elements 216 and associated windings 204, coupled inductor 200 could be modified to be an N-phase coupled inductor, where N is any integer greater than or equal to two. As another example, while the constituent of elements of magnetic core 202 are depicted has having rectangular cross-sections, first magnetic rail 206, second magnetic rail 208, and/or connecting magnetic elements 216 could be modified to have different cross-sectional shapes, such as circular or rounded rectangular cross-sectional shapes. Additionally, thickness 226 of gaps 218 need not be uniform among gap 218 instances or even with a given gap 218. Furthermore, coupled inductor 200 could be modified for use in a different orientation.

FIGS. 12-21 illustrate several alternate embodiments of coupled inductor 200. However, it is appreciated that coupled inductor 200 could have other alternate configurations than those illustrated in FIGS. 12-21.

Figure 14:
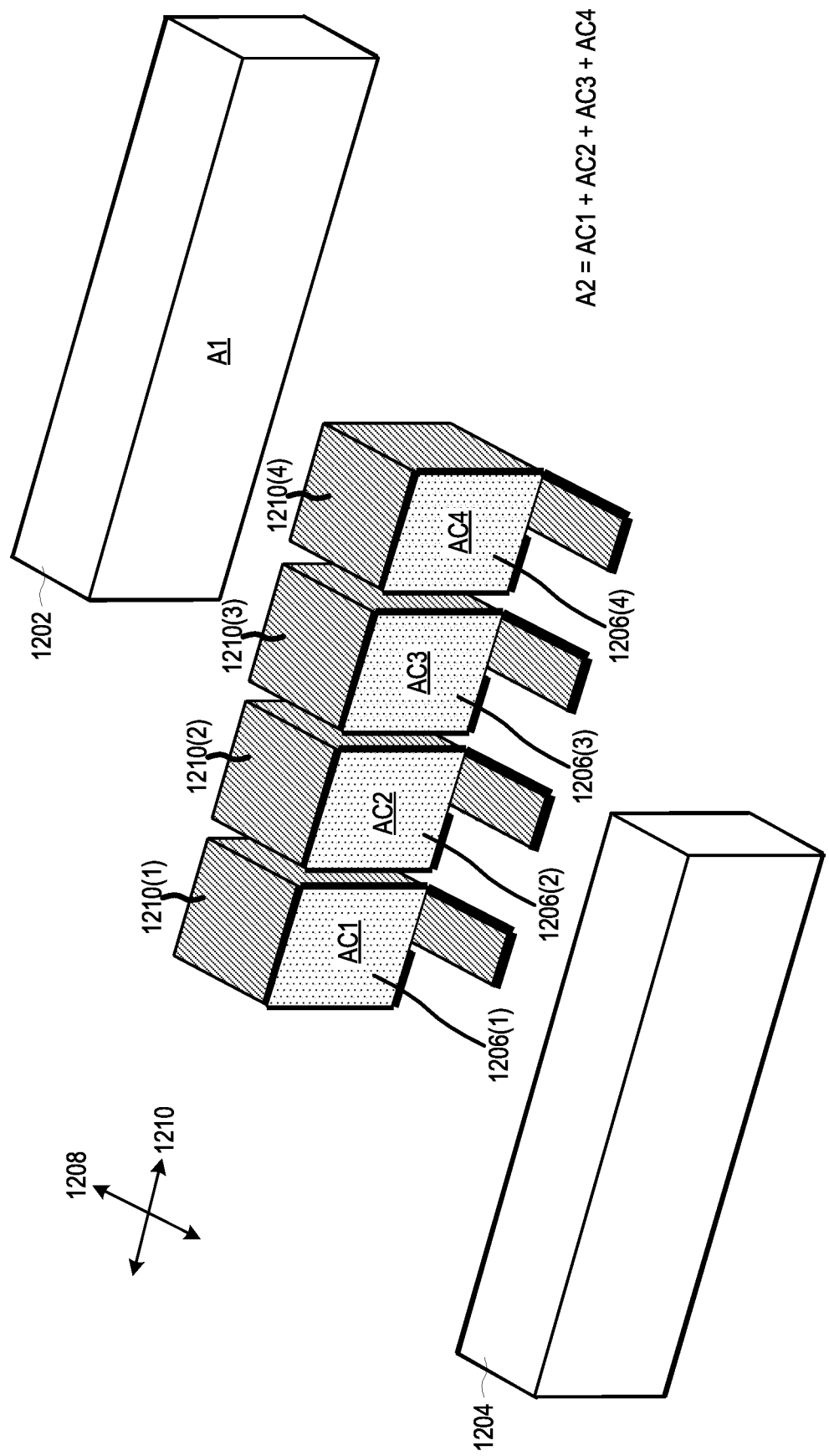
FIG. 14 is an exploded perspective view of the FIG. 12 coupled inductor.

FIG. 12 is a perspective view of a coupled inductor 1200 having a high coupling coefficient, which is an alternate embodiment of coupled inductor 200. FIG. 13 is a perspective view of a winding of coupled inductor 1200, and FIG. 14 is an exploded perspective view of coupled inductor 1200. Coupled inductor 1200 includes a magnetic core free of leakage structures and including a first magnetic rail 1202, a second magnetic rail 1204, and a plurality of connecting magnetic elements 1206. First and second magnetic rails 1202 and 1204 are separated from each other in a direction 1208, and connecting magnetic elements 1206 are separated from each other in a direction 1210, where direction 1210 is orthogonal to direction 1208. Each connecting magnetic element 1206 is disposed between first and second magnetic rails 1202 and 1204 in direction 1208. Connecting magnetic elements 1206 optionally form respective gaps (not visible in FIGS. 12 and 14) in direction 1208, analogous to gaps 218 of coupled inductor 200. Coupled inductor 1200 could be modified to have a different number of connecting magnetic elements 1206, as long as coupled inductor 1200 has at least two connecting magnetic elements 1206.

A respective winding 1210 is at least partially wound around each connecting magnetic element 1206. FIG. 13 is a perspective view of a winding 1210 instance, which is formed of magnetic foil and includes opposing ends 1212 and 1214 forming respective solder tabs. The solder tabs are configured, for example, for soldering to a printed circuit board (PCB). However, windings 1210 could be modified to have different termination elements, such as different solder tabs or through-hole posts in place of solder tables. Additionally, windings 1210 could be modified to form additional turns and/or be formed out of a different type of conductive material, such as insulated or non-insulated wire.

Referring to FIG. 14, first magnetic rail 1202 has a cross-sectional area A1, as seen viewed in direction in 1208. Additionally, connecting magnetic elements 1206 collectively have a cross-sectional area A2 as seen when viewed in direction 1208, where cross-sectional area A2 is the sum of respective cross-sectional areas AC1, AC2, AC3, and AC4 of connecting magnetic elements 1206(1)-1206(4). In some embodiments, a ratio of A1/(A1−A2) is at least 1.5, to realize both a large coupling coefficient and a large product of $L_m$ and $I_{sat}$, in a manner analogous to that discussed above with respect to coupled inductor 200. Additionally, in certain embodiments, a separation distance 1216 between first rail 1202 and second rail 1204 in direction 1208 (FIG. 12) is at least twice a thickness of gaps (not visible) in connecting magnetic elements 1206 in direction 1208, to further help achieve a large value of $L_m$ and corresponding large coupling coefficient value. In embodiments where cross-sectional areas are non-uniform along direction 1208, the cross-sectional areas considered in the ratio of A1/(A1−A2) are the smallest cross-sectional areas along direction 1208.

Figure 15:
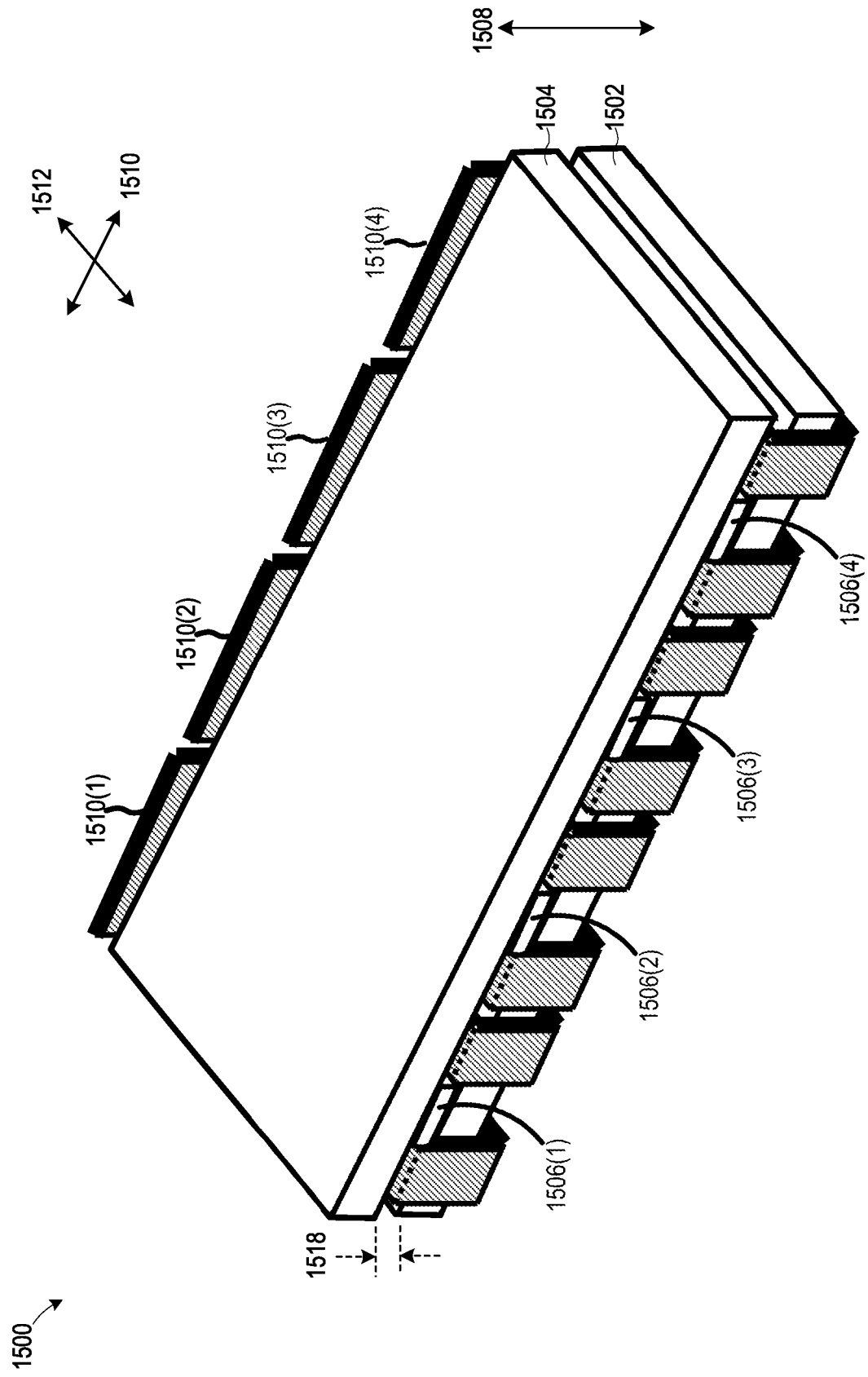
FIG. 15 is a perspective view of another coupled inductor with a high coupling coefficient, according to an embodiment.
Figure 16:
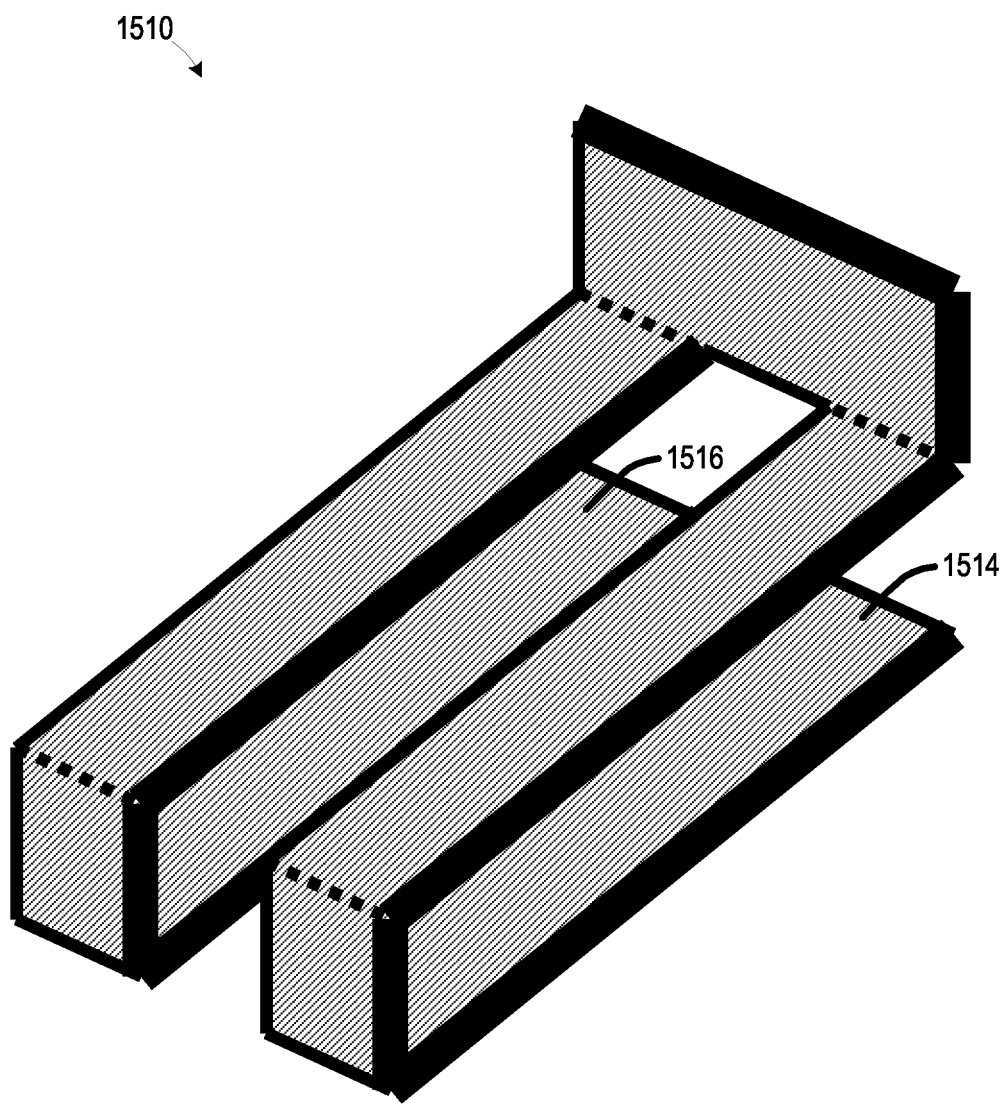
FIG. 16 is a perspective view of a winding of the FIG. 15 coupled inductor.
Figure 17:
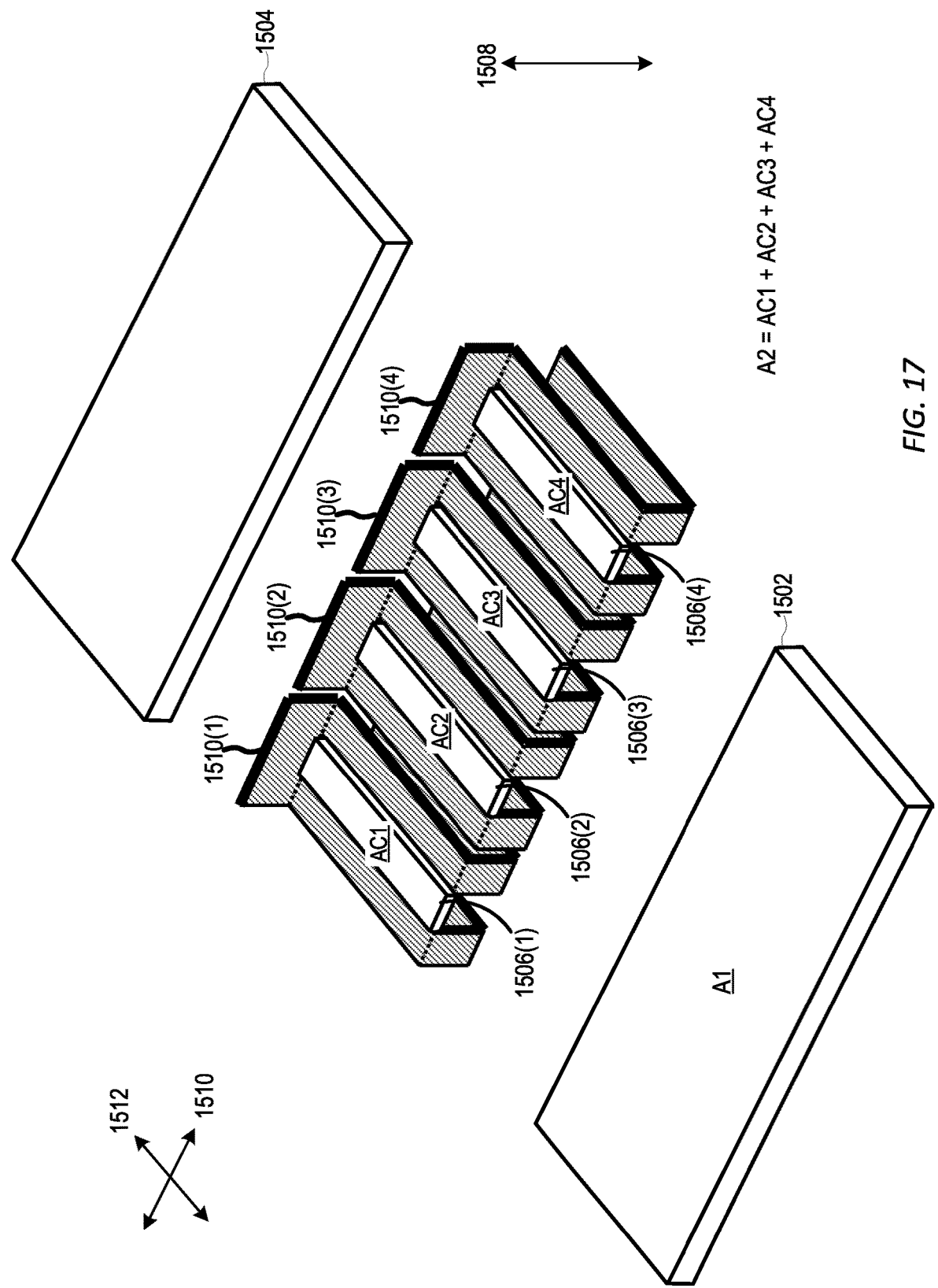
FIG. 17 is an exploded perspective view of the FIG. 15 coupled inductor.

FIG. 15 is a perspective view of a coupled inductor 1500 having a high coupling coefficient, which is another alternate embodiment of coupled inductor 200. FIG. 16 is a perspective view of a winding of coupled inductor 1500, and FIG. 17 is an exploded perspective view of coupled inductor 1500. Coupled inductor 1500 includes a magnetic core free of leakage structures and including a first magnetic rail 1502, a second magnetic rail 1504, and a plurality of connecting magnetic elements 1506. First and second magnetic rails 1502 and 1504 are separated from each other in a direction 1508, and connecting magnetic elements 1506 are separated from each other in a direction 1510, where direction 1510 is orthogonal to direction 1508. Each connecting magnetic element 1506 is disposed between first and second rails 1502 and 1504 in direction 1508. Connecting magnetic elements 1506 optionally form respective gaps (not shown) in direction 1508, analogous to gaps 218 of coupled inductor 200. Coupled inductor 1500 could be modified to have a different number of connecting magnetic elements 1506, as long as coupled inductor 1500 has at least two connecting magnetic elements 1506.

A respective winding 1510 is at least partially wound around each connecting magnetic element 1206. Each winding 1510 extends through the magnetic core in a direction 1512 that is orthogonal to each of directions 1508 and 1510. FIG. 16 is a perspective view of a winding 1510 instance, which is formed of metallic foil and includes opposing winding ends 1514 and 1516 forming respective solder tabs. The solder tabs are configured, for example, for soldering to a PCB. However, windings 1510 could be modified to have different termination elements, such as different solder tabs or through-hole posts in place of solder tables. Additionally, windings 1510 could be modified to form additional turns and/or be formed out of a different type of conductive material, such as insulated or non-insulated wire.

Referring to FIG. 17, first magnetic rail 1502 has a cross-sectional area A1, as seen viewed in direction in 1508. Additionally, connecting magnetic elements 1506 collectively have a cross-sectional area A2 as seen when viewed in direction 1508, where cross-sectional area A2 is the sum of respective cross-sectional areas AC1, AC2, AC3, and AC4 of connecting magnetic elements 1506(1)-1506(4). In some embodiments, a ratio of A1/(A1−A2) is at least 1.5, to realize both a large coupling coefficient and a large product of $L_m$ and $I_{sat}$, in a manner analogous to that discussed above with respect to coupled inductor 200. Additionally, in certain embodiments, a separation distance 1518 between first rail 1502 and second rail 1504 in direction 1508 (FIG. 15) is at least twice a thickness of gaps (not shown) in connecting magnetic elements 1506 in direction 1508, to further help achieve a large value of $L_m$ and corresponding large coupling coefficient value. In embodiments where cross-sectional areas are non-uniform along direction 1508, the cross-sectional areas considered in the ratio of A1/(A1−A2) are the smallest cross-sectional areas along direction 1508.

Figure 20:
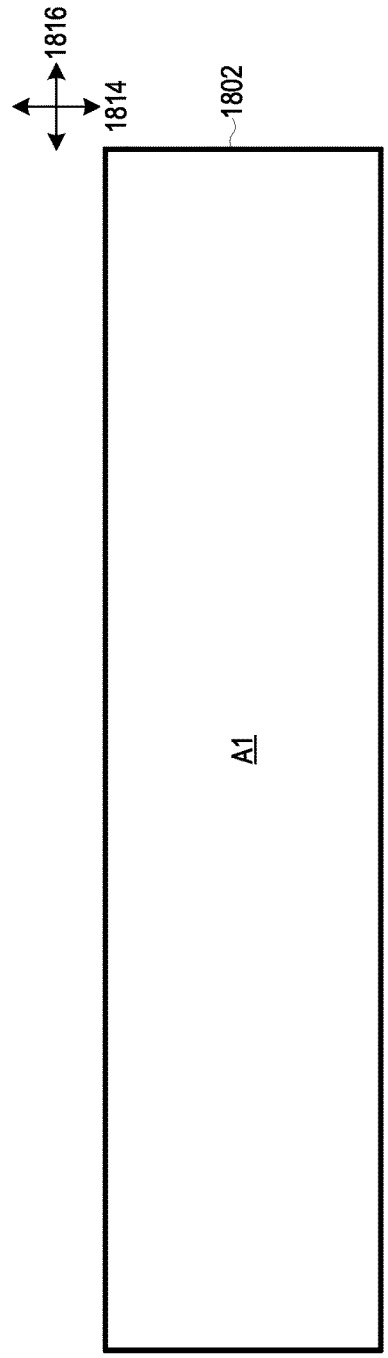
FIG. 20 is a cross-sectional view of the FIG. 18 coupled inductor taken along line 20A-20A of FIG. 19.
Figure 21:
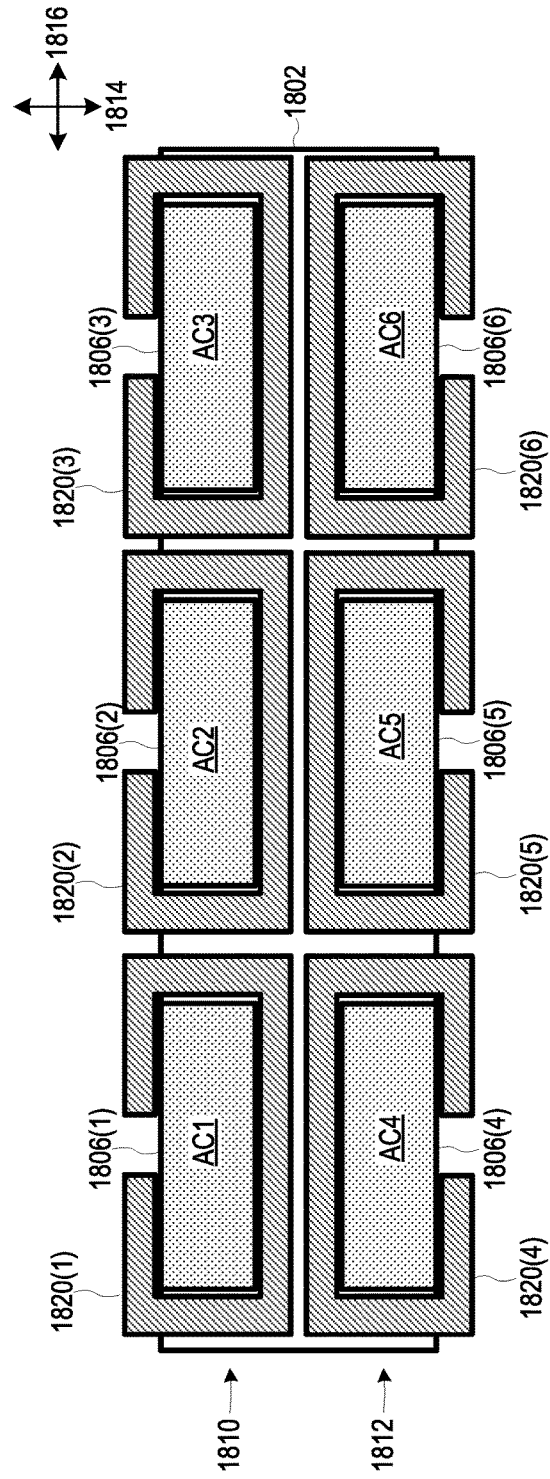
FIG. 21 is a cross-sectional view of the FIG. 18 coupled inductor taken along line 21-21A of FIG. 19.

FIG. 18 is a top plan view of a coupled inductor 1800 having a high coupling coefficient, which is yet another alternate embodiment of coupled inductor 200. FIG. 19 is a front elevational view of coupled inductor 1800, FIG. 20 is a cross-sectional view of coupled inductor 1800 taken along line 20A-20A of FIG. 19, and FIG. 21 is a cross-sectional view of coupled inductor 1800 taken along line 21-21A of FIG. 19. Coupled inductor 1800 includes a magnetic core free of leakage structures and including a first magnetic rail 1802, a second magnetic rail 1804, and a plurality of connecting magnetic elements 1806. First and second magnetic rails 1802 and 1804 are separated from each other in a direction 1808, and connecting magnetic elements 1806 are disposed in two rows 1810 and 1812 (FIG. 21), where rows 1810 and 1812 are separated from each other in a direction 1814 that is orthogonal to direction 1808. Within each row 1810 and 1812, connecting magnetic elements 1806 are separated from each other in a direction 1816 that is orthogonal to each of directions 1808 and 1814. Each connecting magnetic element 1806 is disposed between first and second magnetic rails 1802 and 1804 in direction 1808. Connecting magnetic elements 1806 optionally form respective gaps 1818 in direction 1808 (FIG. 19). Coupled inductor 1800 could be modified to have a different number of connecting magnetic elements 1806, as long as coupled inductor 1800 has at least two connecting magnetic elements 1806.

A respective winding 1820 is at least partially wound around each connecting magnetic element 1806. Although windings 1820 are illustrated as being single-turn windings formed of metallic foil, windings 1820 could be modified to form additional turns and/or be formed out of a different type of conductive material, such as insulated or non-insulated wire.

Referring to FIGS. 20 and 21, first magnetic rail 1802 has a cross-sectional area A1, as seen viewed in direction in 1808. Additionally, connecting magnetic elements 1806 collectively have a cross-sectional area A2 as seen when viewed in direction 1808, where cross-sectional area A2 is the sum of respective cross-sectional areas AC1, AC2, AC3, AC4, AC5, and AC6 of connecting magnetic elements 1806(1)-1806(6). In some embodiments, a ratio of A1/(A1−A2) is at least 1.5, to realize both a large coupling coefficient and a large product of $L_m$ and $I_{sat}$, in a manner analogous to that discussed above with respect to coupled inductor 200. Additionally, in certain embodiments, a separation distance 1822 between first rail 1802 and second rail 1804 in direction 1808 (FIG. 19) is at least twice a thickness (not labeled) of gaps 1818 in connecting magnetic elements 1806 in direction 1808, to further help achieve a large value of $L_m$ and corresponding large coupling coefficient value. In embodiments where cross-sectional areas are non-uniform along direction 1808, the cross-sectional areas considered in the ratio of A1/(A1−A2) are the smallest cross-sectional areas along direction 1808.

Figure 24:
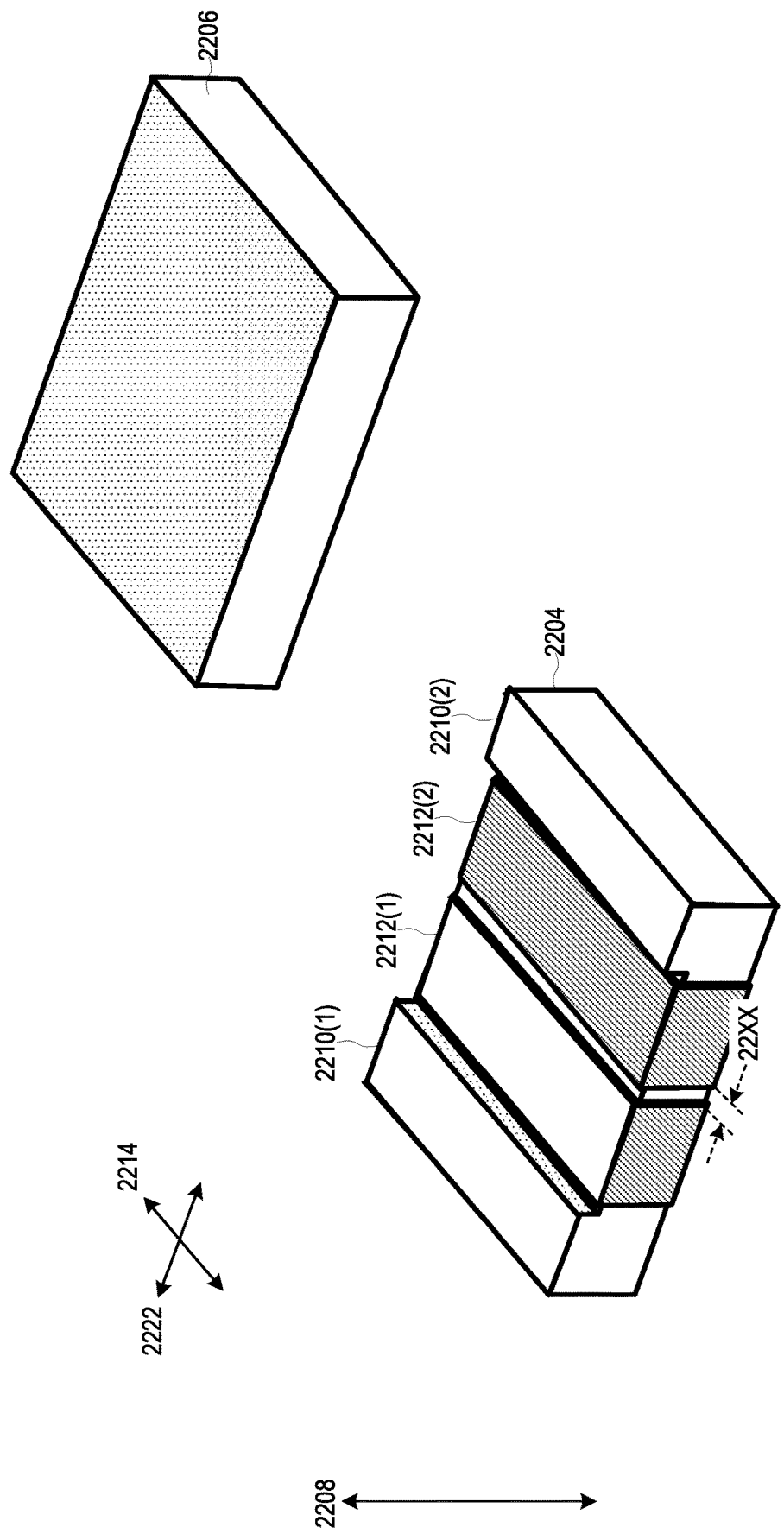
FIG. 24 is an exploded perspective view of the FIG. 22 coupled inductor.

Coupled inductors 200, 1200, 1500, and 1800 (discussed above) are scalable in that they can be configured to support any number of phases greater than or equal to two. Discussed below with respect to FIGS. 22-24, in contrast, is a coupled inductor that is limited to two phases. Specifically, FIG. 22 is a perspective view of a two-phase coupled inductor 2200 having a high coupling coefficient, FIG. 23 is a perspective view of a winding of coupled inductor 2200, and FIG. 24 is an exploded perspective view of coupled inductor 2200. Coupled inductor 2200 includes a magnetic core 2202 that is free of leakage structures and includes a first portion 2204 and second portion 2206 joined in a direction 2208. First portion 2204 includes extensions 2210 extending in direction 2208 for coupling to second portion 2206 (FIG. 24), and second portion 2206 is a magnetic plate disposed over extensions 2210. However, the configurations of first and second portions 2204 and 2206 could vary. For example, in an alternate embodiment, each of first and second portions 2204 and 2206 have a C-shape and are of common size. Additionally, in another alternate embodiment, magnetic core 2202 is a single-piece magnetic core, e.g. a block core forming a channel 2215 for windings (discussed below).

Coupled inductor 2200 further includes two windings 2212, where each winding 2212 extends through magnetic core 2202 in a direction 2214 that is orthogonal to direction 2208. FIG. 23 is a perspective view of one winding 2212 instance. Each winding has opposing ends 2216 and 2218. Although windings 2212 are staple-style windings formed of conductive foil in FIGS. 22-24, windings 2212 could take other forms, such as insulated or non-insulated wire windings, without departing from the scope hereof. In some embodiments, magnetic core 2202 forms a channel 2215 extending through magnetic core 2202 in direction 2214, and windings 2212 are wound through channel 2215.

Magnetic core 2202 has a width 2220 in a direction 2222 that is orthogonal to each of directions 2208 and 2214 (FIG. 22). Additionally, windings 2212(1) and 2212(2) are separated from each other in direction 2222 by a separation distance 2224, as shown in FIG. 22. Importantly, a ratio of separation distance 2224 to width 2220 is no greater than 0.1, to achieve both a large coupling coefficient and a large product of $L_m$ and $I_{sat}$.

Figure 25:
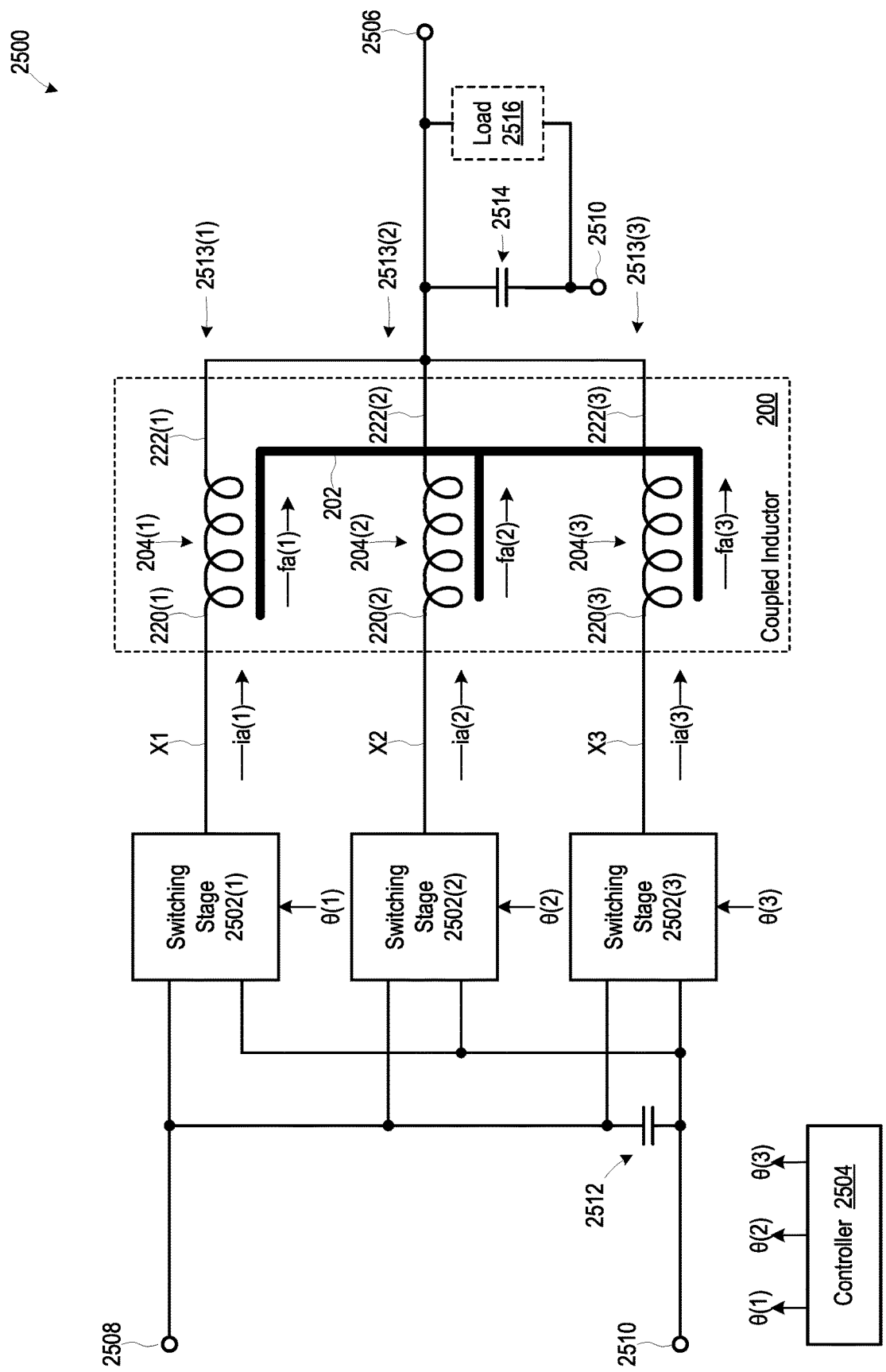
FIG. 25 is a schematic diagram of a switching power converter including an instance of the FIG. 2 coupled inductor, according to an embodiment.

One possible application of the new coupled inductors with high coupling coefficients is in a switching power converter. For example, FIG. 25 is a schematic diagram of a switching power converter 2500 including an instance of coupled inductor 200, a plurality of switching stages 2502, and a controller 2504. The components depicted in FIG. 25 are, for example, disposed on a common substrate (e.g., a printed circuit board (PCB)), or they may be distributed among two or more separate substrates. Coupled inductor 200 is illustrated in FIG. 25 to schematically show magnetic core 202 and windings 204. Ends 220(1) and 222(1) of winding 204(1) are electrically coupled to a switching node X1 and a power node 2506, respectively. Ends 220(2) and 222(2) of winding 204(2) are electrically coupled to a switching node X2 and power node 2506, respectively. Ends 220(3) and 222(3) of winding 204(3) are electrically coupled to a switching node X3 and a power node 2506, respectively.

Each switching stage 2502 is electrically coupled to a power node 2508 and to a power node 2510. Additionally, each switching stage 2502 is electrically coupled to a respective winding 204 of coupled inductor 200. Specifically, switching stage 2502(1) is electrically coupled to switching node X1, switching stage 2502(2) is electrically coupled to switching node X2, and switching stage 2502(3) is electrically coupled to switching node X3. Each switching stage 2502 and respective winding 204 pair may be referred to as a "phase" 2513. For example, phase 2513(1) includes switching stage 2502(1) and winding 204(1). Accordingly, switching power converter 2500 is a three-phase switching power converter.

Switching power converter 2500 optionally includes one or more of a capacitor 2512 and a capacitor 2514. Capacitor 2512 is electrically coupled between power nodes 2508 and 2510, and capacitor 2514 is electrically coupled between power nodes 2506 and 2510. Capacitors 2512 and 2514, for example, provide a path for ripple current and/or help support transient loads.

Controller 2504 is configured to generate control signals θ(1), θ(2), and θ(3) for controlling switching stages 2502(1), 2502(2), and 2502(3), respectively. Each switching stage 2502 is configured to repeatedly switch the terminal 220 of its respective winding 204 between power nodes 2508 and 2510 in response to a respective control signal θ from controller 2504. In some embodiments, controller 2504 is configured to generate control signals θ(1), θ(2), and θ(3) so that switching stages 2502 switch out-of-phase with respect to each other. For example, in one embodiment, controller 2504 is configured to generate control signals θ(1), θ(2), and θ(3) so that switching stages 2502 switch 120 degrees out-of-phase with respect to each other. Additionally, in some embodiments, controller 2504 is configured to generate control signals θ(1), θ(2), and θ(3) to regulate one or more parameters of switching power converter 2500, such as magnitude of voltage at one of power nodes 2506, 2508, and 2510, and/or current flowing into or out of one of more of power nodes 2506, 2508, and 2510.

In some embodiments, power node 2508 is an input power node, power node 2510 is a reference power node, and power node 2506 is an output power node, such that switching power converter 2500 has a multi-phase buck topology. In some other embodiments, power node 2506 is an input power node, power node 2508 is an output power node, and power node 2510 is a reference power node, such that switching power converter 2500 has a multi-phase boost topology. In yet some other embodiments, power node 2508 is an input power node, power node 2506 is a reference power node, and power node 2510 is an output power node, such that switching power converter 2500 has a multi-phase buck-boost topology. Locations of optional capacitors 2512 and 2514 in switching power converter 2500 may vary according to the topology of switching power converter 2500. For example, capacitor 2512 may be electrically coupled between power nodes 2508 and 2506 if switching power converter 2500 has a multi-phase buck-boost topology.

Although each of switching stages 2502 and controller 2504 are illustrated as being discrete elements, two or more of these elements may be partially or fully combined. For example, in one embodiment, controller 2504 is combined with switching stage 2502(1) to form a master switching stage, and switching stages 2502(2) and 2502(3) are subservient switching stages that are controlled by the master switching stage.

Switching stages 2502 and coupled inductor 200 are optionally collectively configured such that there is negative coupling between all windings 204 of coupled inductor 200 during operation of switching power converter 2500. In this document, a switching power converter including a coupled inductor, or an associated assembly including a coupled inductor, achieves "negative coupling" if magnetic flux generated by current flowing through each winding of the coupled inductor opposes flux magnetic flux generated by current flowing through each other winding of the coupled inductor, within portions of the magnetic core that the windings are wound around, during operation of the switching power converter or associated assembly.

For example, assume that switching stages 2502 and coupled inductor 200 are collectively configured such that windings 204(1), 204(2), and 204(3) generate respective magnetic fluxes fa(1), fa(2), and fa(3) in response to respective currents ia(1), ia(2), and ia(3) flowing through the windings, as symbolically shown in FIG. 25, during operation of switching power converter 2500. Switching stages 2502 and coupled inductor 200 achieve negative coupling if, and only if, (a) magnetic flux fa(1) opposes magnetic flux fa(2) within connecting magnetic element 216(2), (b) magnetic flux fa(1) opposes magnetic flux fa(3) within connecting magnetic element 216(3), (c) magnetic flux fa(2) opposes magnetic flux fa(1) within connecting magnetic element 216(1), (d) magnetic flux fa(2) opposes magnetic flux fa(3) within connecting magnetic element 216(3), (e) magnetic flux fa(3) opposes magnetic flux fa(1) within connecting magnetic element 216(1), and (f) magnetic flux fa(3) opposes magnetic flux fa(2) within connecting magnetic element 216(2). In this document, two magnetic fluxes oppose each other in a magnetic core if the two magnetic fluxes flow in at least substantially opposite directions in the magnetic core.

Figure 32:
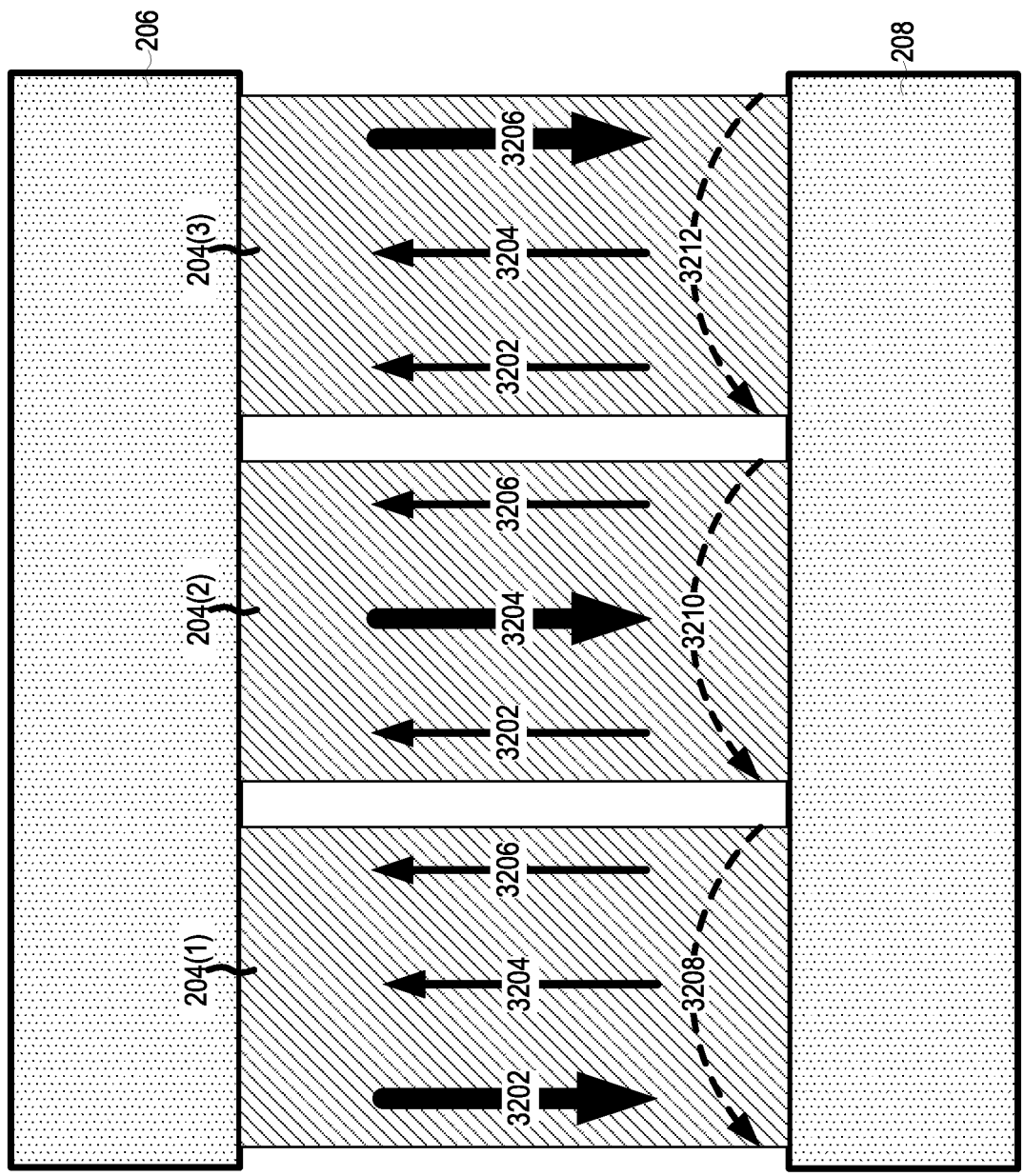
FIG. 32 is a top plan view of the FIG. 2 coupled inductor that is marked-up to illustrate one example of negative magnetic coupling.

FIG. 32 is a top plan view of coupled inductor 200 that is marked-up to illustrate one example of negative magnetic coupling. In this example, arrows 3202, 3204, and 3206 represent magnetic flux within magnetic core 202 that is generated by respective currents flowing through windings 204(1), 204(2), and 204(3) in a counter-clockwise direction, as illustrated by respective arrows 3208, 3210, and 3212 indicating current flow direction. While switching stages are not shown in FIG. 32, coupled inductor 200 and switching stages are collectively configured in this example such that magnetic coupling is achieved, as illustrated by the directions of arrows 3202, 3204, and 3206. For example, within connecting magnetic element 216(2) (underneath winding 204(2) in the FIG. 32 top plan view), magnetic flux 3202 generated by current flowing through winding 204(1) opposes magnetic flux 3204 generated by winding 204(2). As another example, within connecting magnetic element 216(1) (underneath winding 204(1) in the FIG. 32 top plan view), magnetic flux 3206 generated by current flowing through winding 204(3) opposes magnetic flux 3202 generated by current flowing through winding 204(1). Within a given connecting magnetic element 216, native magnetic flux, i.e., magnetic flux generated by current flowing through the respective winding 204 wound around the connecting magnetic element, will be stronger than neighboring magnetic flux, i.e., magnetic flux generated by current flowing through respective windings 204 of other connecting magnetic elements 216. Accordingly, native magnetic flux is represented by thicker arrows than neighboring magnetic flux in the FIG. 32 illustration. It should be noted that the directions of magnetic fluxes in FIG. 32 could change without affecting negative magnetic coupling, as long as all magnetic fluxes change their respective directions.

Referring again to FIG. 25, while this figure symbolically shows currents ia(1)-ia(3) and magnetic fluxes fa(1)-fa(3) flowing from left to right, FIG. 25 should not be construed to require any particular direction of current flow or any particular direction of magnetic flux flow. For example, currents ia(1), ia(2), and ia(3) could be negative as well as positive, i.e., they could flow away from a load 2516 instead of toward load 2516, depending on operating state of switching power converter 2500. Additionally, while FIG. 25 depicts magnetic fluxes fa(1), fa(2), and fa(3) flowing toward the right in response to currents ia(1), ia(2), and ia(3), magnetic fluxes fa(1), fa(2), and fa(3) could instead flow toward the left in response to currents ia(1), ia(2), and ia(3), depending on the implementation and operation of switching power converter 2500. Inverse magnetic coupling is not affected by current flow direction or magnetic flux flow direction as long as magnetic flux generated by current flowing through each winding 204 of coupled inductor 200 opposes flux magnetic flux generated by current flowing through each other winding 204 of coupled inductor 200, within portions of the magnetic core that the windings are wound around. Additionally, inverse magnetic coupling could be achieved if coupled inductor 200 were replaced with another coupled inductor, as long as magnetic flux generated by current flowing through each winding of the coupled inductor opposes magnetic flux generated by current flowing through each other winding of the coupled inductor, within portions of the magnetic core that the windings are wound around.

Switching power converter 2500 is optionally configured to power load 2516. Load 2516 need not be part of switching power converter 2500. Load 2516 is shown as being electrically coupled between power nodes 2506 and 2510, which is appropriate in embodiments of switching power converter 2500 having a multi-phase buck topology or a multi-phase buck-boost topology. Load 2516 is electrically coupled between power nodes 2508 and 2510 in embodiments having a multi-phase boost topology. In some embodiments, load 2516 includes one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit.

Switching power converter 2500 can be modified to have a different number of phases, such as by modifying coupled inductor 200 to have a different number of windings or by replacing coupled inductor 200 with another coupled inductor having a different number of windings. Additionally, coupled inductor 200 could be replaced with another one of the coupled inductors disclosed herein, with changes to the number of switching stages 2502 and controls signals θ generated by controller 2504, as appropriate.

Figure 26:
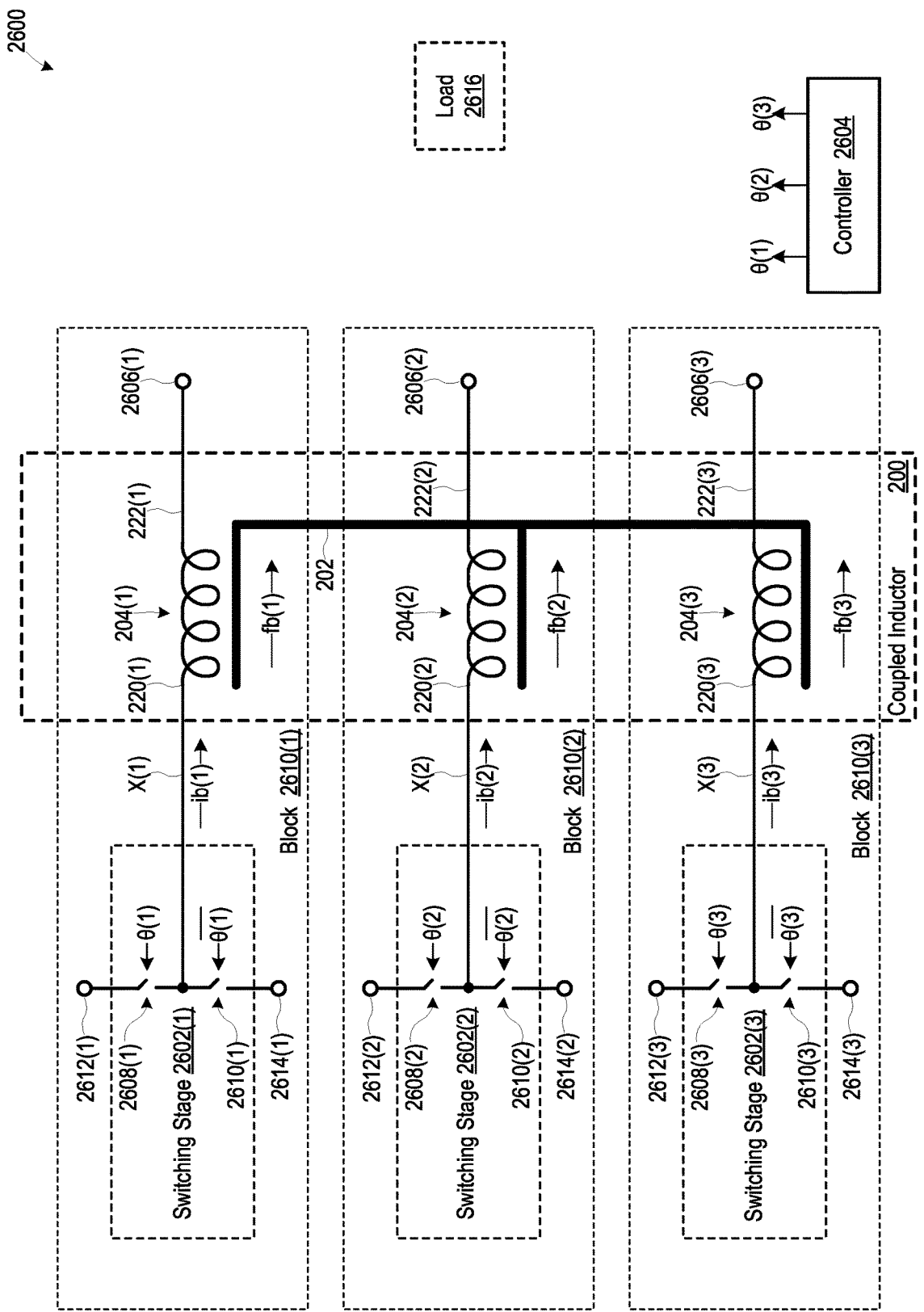
FIG. 26 is a schematic diagram of a switching power converter assembly including an instance of the FIG. 2 coupled inductor, according to an embodiment.

FIG. 26 illustrates another example application of the coupled inductors disclosed herein. Specifically, FIG. 26 is a schematic diagram of a switching power converter assembly 2600 including an instance of coupled inductor 200, a plurality of switching stages 2602, and a controller 2604. The components depicted in FIG. 26 are, for example, disposed on a common substrate (e.g., a PCB), or they may be distributed among two or more separate substrates. Coupled inductor 200 is illustrated in FIG. 26 to schematically show magnetic core 202 and windings 204. Ends 220(1) and 222(1) of winding 204(1) are electrically coupled to a switching node X(1) and a power node 2606(1), respectively. Ends 220(2) and 222(2) of winding 204(2) are electrically coupled to a switching node X(2) and a power node 2606(2), respectively. Ends 220(3) and 222(3) of winding 204(3) are electrically coupled to a switching node X(3) and a power node 2606(3), respectively. Each switching stage 2602 is electrically coupled to a respective winding 204, as discussed further below.

Each switching stage 2602 and respective winding 204 pair may be referred to as a "block" 2610. For example, block 2610(1) includes switching stage 2602(1) and winding 204(1). Accordingly, switching power converter 2600 is a three-block switching power converter. However, switching power converter 2600 could be modified to have a different number of blocks 2610, as long as it has at least two blocks 2610. Additionally, each block 2610 may include additional components (not shown), including but not limited to capacitors, driver circuitry, and/or monitoring circuitry.

Each switching stage 2602 includes a first switching device 2608 electrically coupled between a respective power node 2612 and the respective switching node X of the block 2610 including the switching stage. Additionally, each switching stage 2602 includes a second switching device 2610 electrically coupled between the respective switching node X and a respective power node 2614 of the block 2610 including the switching stage. Each switching device 2608 and 2610 includes, for example, one or more transistors, such as one or more field effect transistors (FETs), one or more bipolar junction transistors (BJTs), and/or one or more insulated gate bipolar junction transistors (IGBTs).

Controller 2604 is configured to generate control signals θ(1), θ(2), and θ(3) for controlling switching stages 2602(1), 2602(2), and 2602(3), respectively. Each switching stage 2602 is configured to repeatedly switch the terminal 220 of its respective winding 204 between at least power nodes 2612 and 2614, in response to a respective control signal θ from controller 2604. For example, in certain embodiments, each first switching device 2608 operates in its on-state (conductive state) when its respective control signal θ is asserted, and each first switching device 2608 operates in its off-state (non-conductive state) when its respective control signal θ is de-asserted. Additionally, in these embodiments, each second switching device 2610 operates in its off-state (non-conductive state) when its respective control signal θ is asserted, and each second switching device 2610 operates in its on-state (conductive state) when its respective control signal θ is de-asserted. Accordingly, in particular embodiments, first and second switching devices 2608 and 2610 within a given switching stage 2602 switch in a nominally complementary manner, although there may be deadtime where both of the first and second switching devices 2608 and 2610 operate in their respective off-states to prevent shoot through.

In some embodiments, controller 2604 is configured to generate control signals θ(1), θ(2), and θ(3) so that switching stages 2602 switch out-of-phase with respect to each other. For example, in one embodiment, controller 2604 is configured to generate control signals θ(1), θ(2), and θ(3) so that switching stages 2602 switch 120 degrees out-of-phase with respect to each other. Additionally, in some embodiments, controller 2604 is configured to generate control signals θ(1), θ(2), and θ(3) to regulate one or more parameters of switching power converter 2600, such as magnitude of voltage at one of more nodes, and/or current flowing into or out of one or more nodes.

In certain embodiments, each power node 2612 is an input power node, each power node 2614 is a reference power node, and each power node 2606 is an output power node, such that switching power converter assembly 2600 has a buck-type topology. In some other embodiments, each power node 2606 is an input power node, each power node 2612 is an output power node, and each power node 2614 is a reference power node, such that switching power converter assembly 2600 has a boost-type topology. In yet some other embodiments, each power node 2612 is an input power node, each power node 2614 is an output power node, and each power node 2606 is an reference power node, such that switching power converter assembly 2600 has a buck-boost-type topology.

In some embodiments, each block 2610 is itself a switching power converter, such that assembly 2600 includes three separate switching power converters, albeit with magnetically coupled inductors. For example, in certain embodiments, each block 2610 is itself a buck converter, a boost converter, or a buck-boost converter configured to provide a different power supply voltage. Two or more blocks 2610 are optionally connected in a daisy chain fashion. For example, an output of one block 2610 may be connected to an input of another block 2610, such that one block 2610 provides an input power to another block 2610. In other embodiments, assembly 2600 is a multi-phase switching power converter, and each block 2610 is a respective phase of the multi-phase switching power converter. For example, in some embodiments, each block 2610 is a respective phase of a multiphase buck converter, a multi-phase boost converter, or a multi-phase buck-boost converter.

Switching stages 2602 and coupled inductor 200 are optionally collectively configured such that there is negative coupling between all windings 204 of coupled inductor 200 during operation of switching power converter assembly 2600. For example, assume that switching stages 2602 and coupled inductor 200 are collectively configured such that windings 204(1), 204(2), and 204(3) generate respective magnetic fluxes fb(1), fb(2), and fb(3) in response to respective currents ib(1), ib(2), and ib(3), as symbolically in FIG. 26, during operation of switching power converter assembly 2600. Switching stages 2602 and coupled inductor 200 achieve negative coupling if, and only if, (a) magnetic flux fb(1) opposes magnetic flux fb(2) within connecting magnetic element 216(2), (b) magnetic flux fb(1) opposes magnetic flux fb(3) within connecting magnetic element 216(3), (c) magnetic flux fb(2) opposes magnetic flux fb(1) within connecting magnetic element 216(1), (d) magnetic flux fb(2) opposes magnetic flux fb(3) within connecting magnetic element 216(3), (e) magnetic flux fb(3) opposes magnetic flux fb(1) within connecting magnetic element 216(1), and (f) magnetic flux fb(3) opposes magnetic flux fb(2) within connecting magnetic element 216(2).

FIG. 26 should not be construed to require any particular direction of current flow or any particular direction of magnetic flux flow. For example, currents ib(1), ib(2), and ib(3) could be negative as well as positive, i.e., they could flow away from a load 2616 instead of toward load 2616, depending on operating state of assembly 2600. Additionally, while FIG. 26 depicts magnetic fluxes fb(1), fb(2), and fb(3) flowing toward the right in response to currents ib(1), ib(2), and ib(3), magnetic fluxes fb(1), fb(2), and fb(3) could instead flow toward the left in response to currents ib(1), ib(2), and ib(3), depending on the implementation and operation of assembly 2600. Inverse magnetic coupling is not affected by current flow direction or magnetic flux flow direction as long as magnetic flux generated by current flowing through each winding 204 of coupled inductor 200 opposes flux magnetic flux generated by current flowing through each other winding 204 of coupled inductor 200, within portions of the magnetic core that the windings are wound around. Additionally, inverse magnetic coupling could be achieved if coupled inductor 200 were replaced with another coupled inductor in assembly 2600, as long as magnetic flux generated by current flowing through each winding of the coupled inductor opposes magnetic flux generated by current flowing through each other winding of the coupled inductor, within portions of the magnetic core that the windings are wound around.

Switching power converter assembly 2600 is optionally configured to power one or more loads 2616. Loads 2616 need not be part of switching power converter assembly 2600. In embodiments where each block 2610 is a separate switching power converter, each block 2610 may power its own respective load 2616. Connections (not shown) between loads 2616 and nodes of switching power converter assembly 2600 will vary depending on the topology of switching power converter assembly 2600. In some embodiments, each load 2616 includes one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit.

Although each of switching stages 2602 and controller 2604 are illustrated as being discrete elements, two or more of these elements may be partially or fully combined. For example, in one embodiment, elements of controller 2604 are distributed among switching stages 2602. Additionally, coupled inductor 200 could be replaced with another one of the coupled inductors disclosed herein, with changes to the number of switching stages 2602 and controls signals θ generated by controller 2604, as appropriate.

Figure 27:
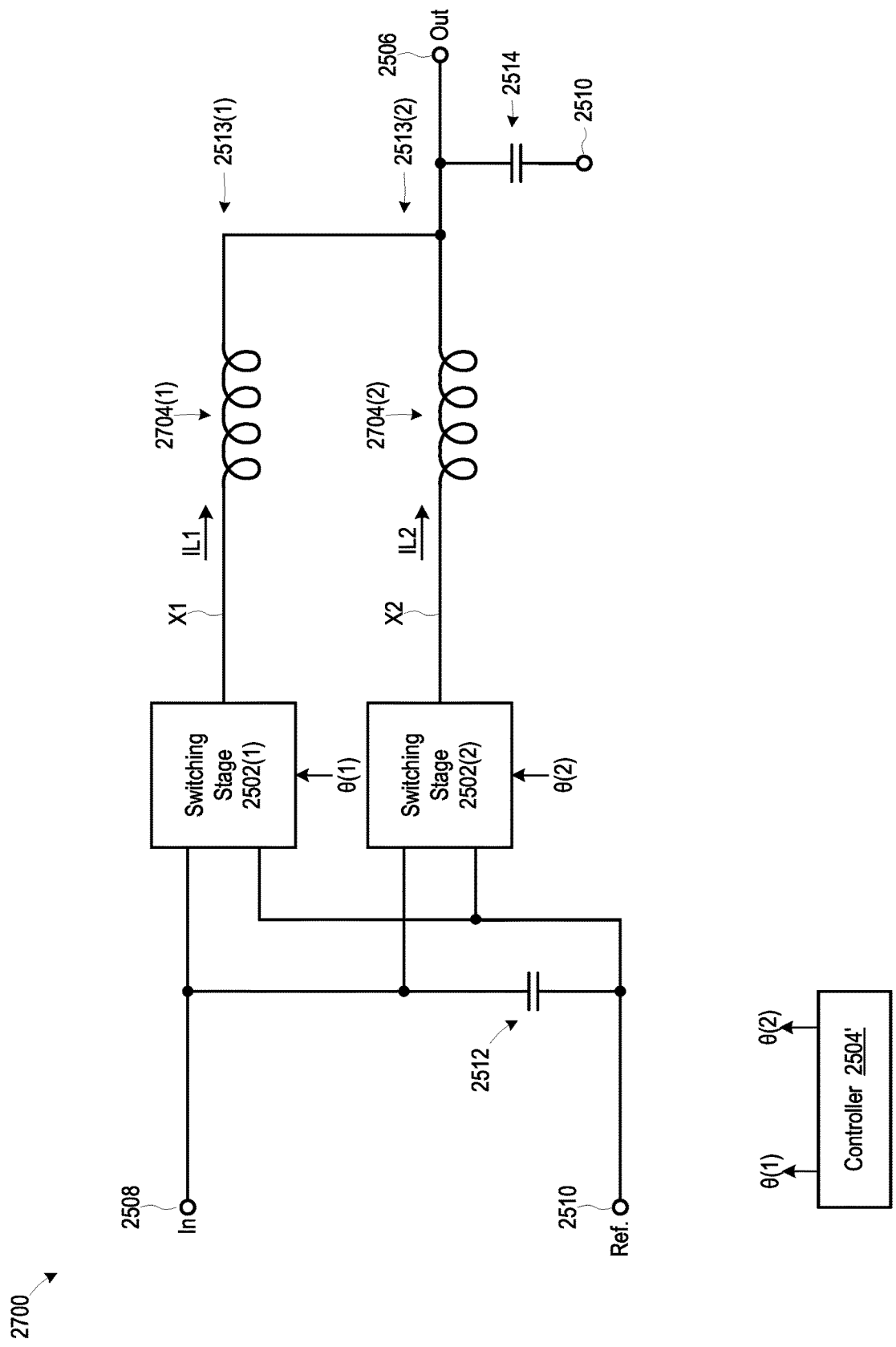
FIG. 27 is a schematic diagram of a switching power converter including discrete inductors.

It is generally desirable that phases in a switching power converter handle the same magnitude of current, or in other words, that the phases equally share current, such as to prevent overloading of one phase and/or underutilization of another phase. For example, certain embodiments of controllers 2504, 2504', and 2604 are configured to control switching stages 2502 or 2602 to switch terminals 220 of respective windings 204 in a manner which at least substantially maintains a common direct current (DC) component in currents through windings 204. The large coupling coefficient of the new coupled inductors disclosed herein advantageously promotes equal sharing of current among phases. To help appreciate this advantage, first consider a two-phase buck switching power converter 2700 with discrete inductors 2704, as illustrated in FIG. 27. Switching power converter 2700 is like switching power converter 2500 of FIG. 25 with the following exceptions: (1) switching power converter 2700 has two phases 2513 instead of three phases 2513, (2) coupled inductor 200 is replaced with two discrete inductors 2704, and (3) controller 2504 is replaced with a controller 2504' which generates two control signals θ instead of three control signals θ. Additionally, switching power converter 2700 is configured to have a buck topology (instead of a boost or buck-boost topology), and the power nodes accordingly have the following configuration: (1) power node 2508 is an input power node, (2) power node 2510 is a reference power node, and (3) and power node 2506 is an output power node.

Figure 28:
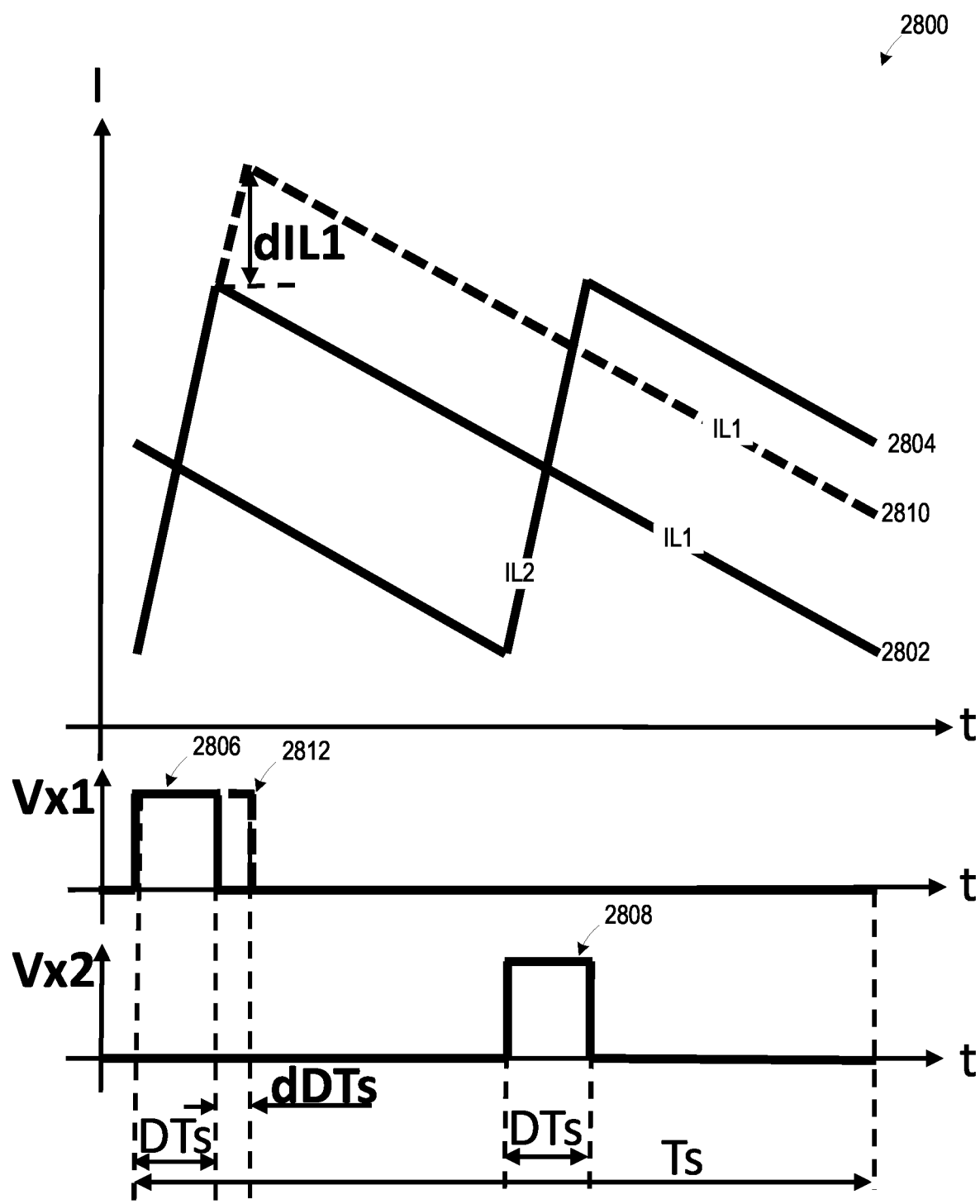
FIG. 28 is a graph illustrating one example of operation of the FIG. 27 switching power converter.

FIG. 28 is a graph 2800 illustrating one example of operation of switching power converter 2700. Curve 2802 represents magnitude of current flowing IL1 flowing through inductor 2704(1) under steady state operating conditions, and curve 2804 represents current IL2 flowing through inductor 2704(2) under steady state operating conditions. Additionally, curve 2806 represents voltage at switching node X1 under steady state operating conditions, and curve 2808 represents voltage at switching node X2 under steady state operating conditions. Each inductor 2704 is driven high, i.e. with a voltage equal to the converter input voltage minus the converter output voltage, for a time period D*Ts under steady state operating conditions, where D is converter duty cycle and Ts is converter switching period. As evident when comparing curves 2802 and 2804, phase 2513(1) and phase 2513(2) share current substantially equally under steady state operating conditions.

Curve 2810 represents current IL1 during an increase of the duty cycle only in phase 2513(1) associated with switching node X1, for example to adjust current in inductor 2704(1) as compared to current in inductor 2704(2). Magnitude of current IL1 increases by dIL1. Additionally, curve 2812 represents voltage at switching node X1 during the transient operating condition. Switching node X1 is driven high for an additional time period dDTs. As evident when comparing curves 2802, 2804, and 2810, the increase of the duty cycle in first phase 2513(1) causes magnitude of current through inductor 2704(1) to substantially increase, but this change in magnitude of current through inductor 2704(1) does not immediately result in a change in magnitude of current through inductor 2704(2). As a result, magnitude of current handled by phases 2513(1) and 2513(2) is made substantially different. It may take multiple switching periods for controller 2504' to adjust operation of switching stages 2502 for desired current adjustment, for example to correct current unbalance.

Figure 29:
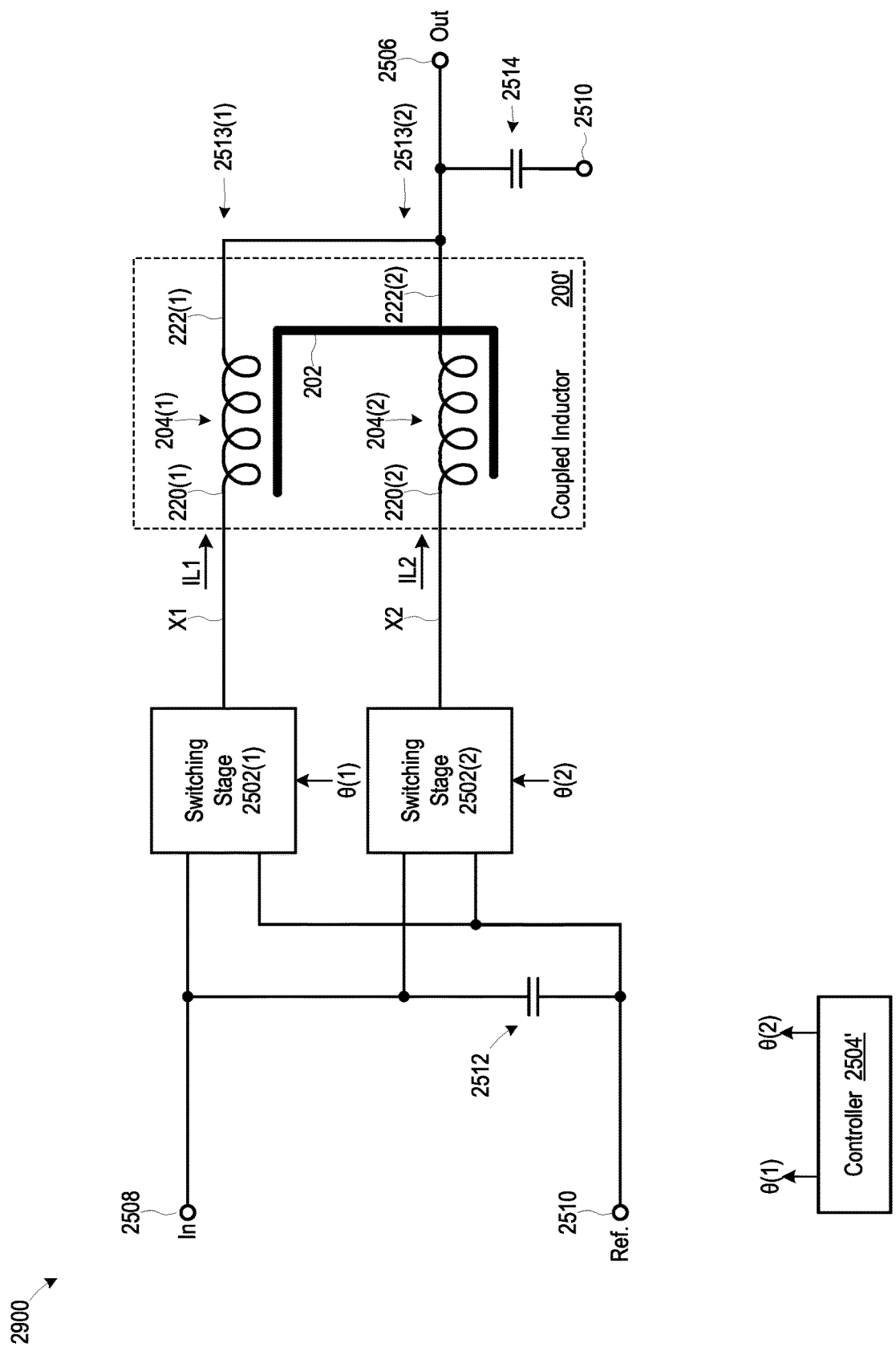
FIG. 29 is a schematic diagram of an alternate embodiment of the FIG. 25 switching power converter.

FIG. 29 is a schematic diagram of a switching power converter 2900, which is an alternate embodiment of switching power converter 2500 of FIG. 25. Switching power converter 2900 is like switching power converter 2500 of FIG. 25 with the following exceptions: (1) switching power converter 2900 has two phases 2513 instead of three phases 2513, (2) coupled inductor 200 is replaced with a coupled inductor 200' which is an alternate embodiment of coupled inductor 200 including only two windings 204, and (3) controller 2504 is replaced with a controller 2504' which generates two control signals θ instead of three control signals θ. Additionally, switching power converter 2900 is configured to have a buck topology (instead of a boost or buck-boost topology), and the power nodes accordingly have the following configuration: (1) power node 2508 is an input power node, (2) power node 2510 is a reference power node, and (3) and power node 2506 is an output power node.

Figure 30:
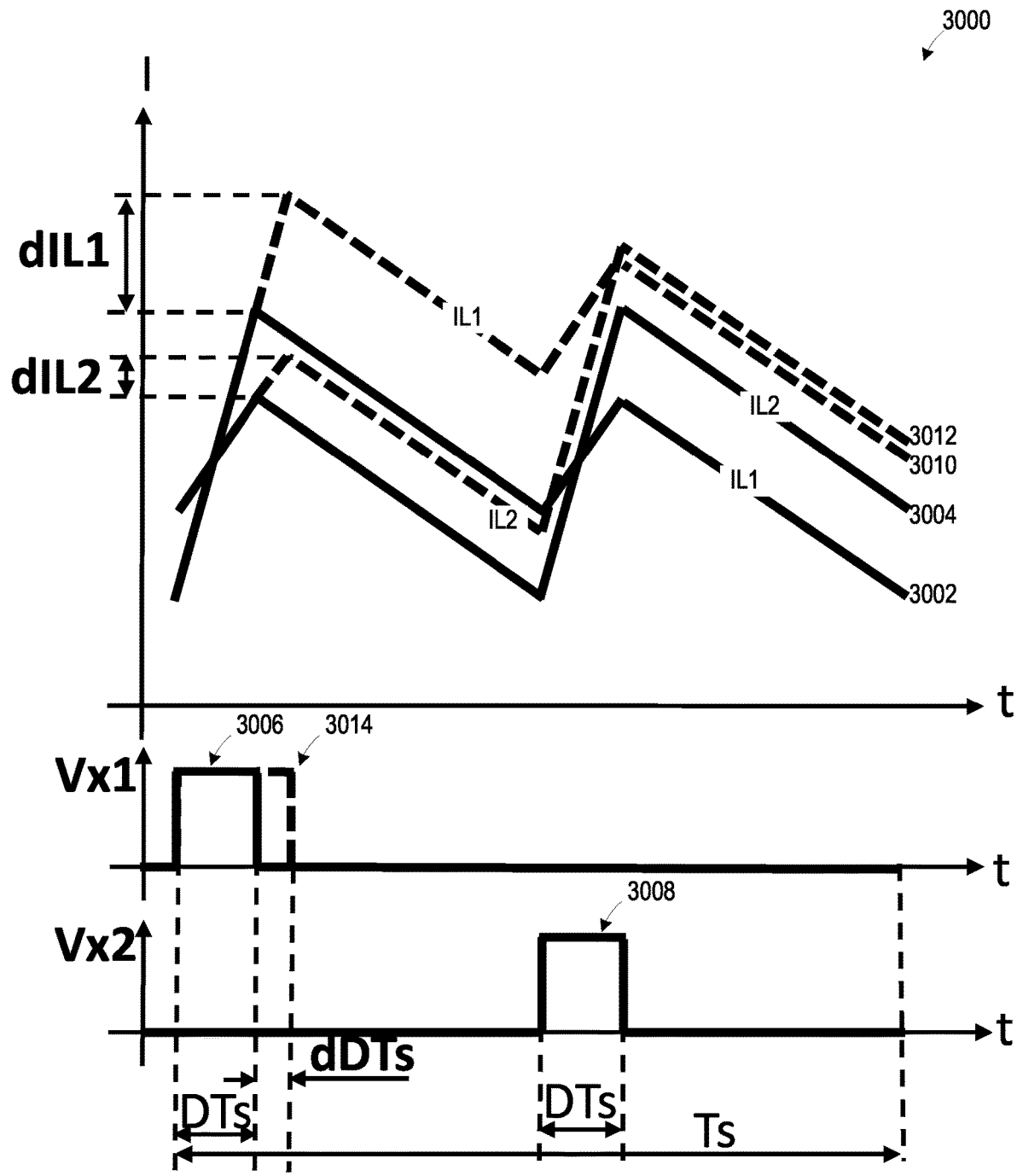
FIG. 30 is a graph illustrating one example of operation of the FIG. 29 switching power converter.

FIG. 30 is a graph 3000 illustrating one example of operation of switching power converter 2900. Curve 3002 represents magnitude of current IL1 flowing through winding 204(1) under steady state operating conditions, and curve 3004 represents current IL2 flowing through winding 204(2) under steady state operating conditions. Additionally, curve 3006 represents voltage at switching node X1 under steady state operating conditions, and curve 3008 represents voltage at switching node X2 under steady state operating conditions. Each switching node X1 and X2 is driven high, i.e. with a voltage equal to the converter input voltage minus the converter output voltage, for a time period D*Ts under steady state operating conditions, where D is converter duty cycle and Ts is converter switching period. As evident when comparing curves 3002 and 3004, phases 2513(1) and phases 2513(2) share current substantially equally over two switching cycles during steady state operation.

Curve 3010 represents current IL1 during an increase of the duty cycle only in phase 2513(1) associated with switching node X1, for example to adjust current in winding 204(1) as compared to current in winding 204(2). Magnitude of current IL1 increases by dIL1. Curve 3012 represents current IL2 during the transient operating condition of switching power converter 2900. Magnitude of current IL2 increases by dIL2 due to the magnetic coupling between windings 204(2) and 204(1).

Additionally, curve 3014 represent voltage at switching node X1 during the transient operating condition. Switching node X1 is driven high for an additional time period dDTs, for example to adjust current in winding 204(1) as compared to current in winding 204(2). As evident when comparing curves 3002, 3004, 3010, and 3012, the increase of the duty cycle in the first phase causes 2513(1) magnitude of current through winding 204(1) to substantially increase by dIL1, which also causes a large increase in current through winding 204(2) by dIL2, due to the high coupling coefficient of coupled inductor 200'. The higher coupling coefficient $L_m/L_k$ is, the closer dIL2 value will be to dIL1, minimizing the introduced difference between phase currents. Indeed, current through windings 204(1) and 204(2) will be essentially balanced at the start of the next switching cycle, i.e. when winding switching node X1 is driven high if coupling coefficient $L_m/L_k$ is high. If coupling coefficient $L_m/L_k$ is small and approaches zero, the waveforms will be similar to those shown in FIG. 28 for discrete inductors. Thus, the high coupling coefficients of the new coupled inductors helps achieve equal current sharing among phases in switching power converter applications of the coupled inductors when a disturbance in control signals is introduced.

It should be noted that although the high coupling coefficients of the new coupled inductors helps prevent current sharing imbalance among phases is switching power converter applications, it may also slow balancing in the event current does become unbalanced among the phases. Consequently, some embodiments of controllers 2504, 2504', and 2604 are designed to operate with a smaller current adjustment per switching cycle for a giving duty cycle change, compared to a conventional controller for a multi-phase switching power converter.

Furthermore, Applicant has determined that use of a coupled inductor with a high coupling coefficient in a switching power converter can present challenges in the design of a controller (e.g., controller 2504, 2504', or 2604) for the switching power converter. Specifically, the high coupling coefficient causes current flowing through one winding to significantly influence current in other windings, so that current through one winding is highly dependent on current flowing through the other windings. Indeed, currents through the various windings may be almost identical if the coupling coefficient is very high. This strong interaction between currents flowing through the coupled inductor's windings may complicate use of current mode control to control the switching power converter because current flowing through one winding of the coupled inductor is highly influenced by current flowing through other windings of the coupled inductor.

Figure 31:
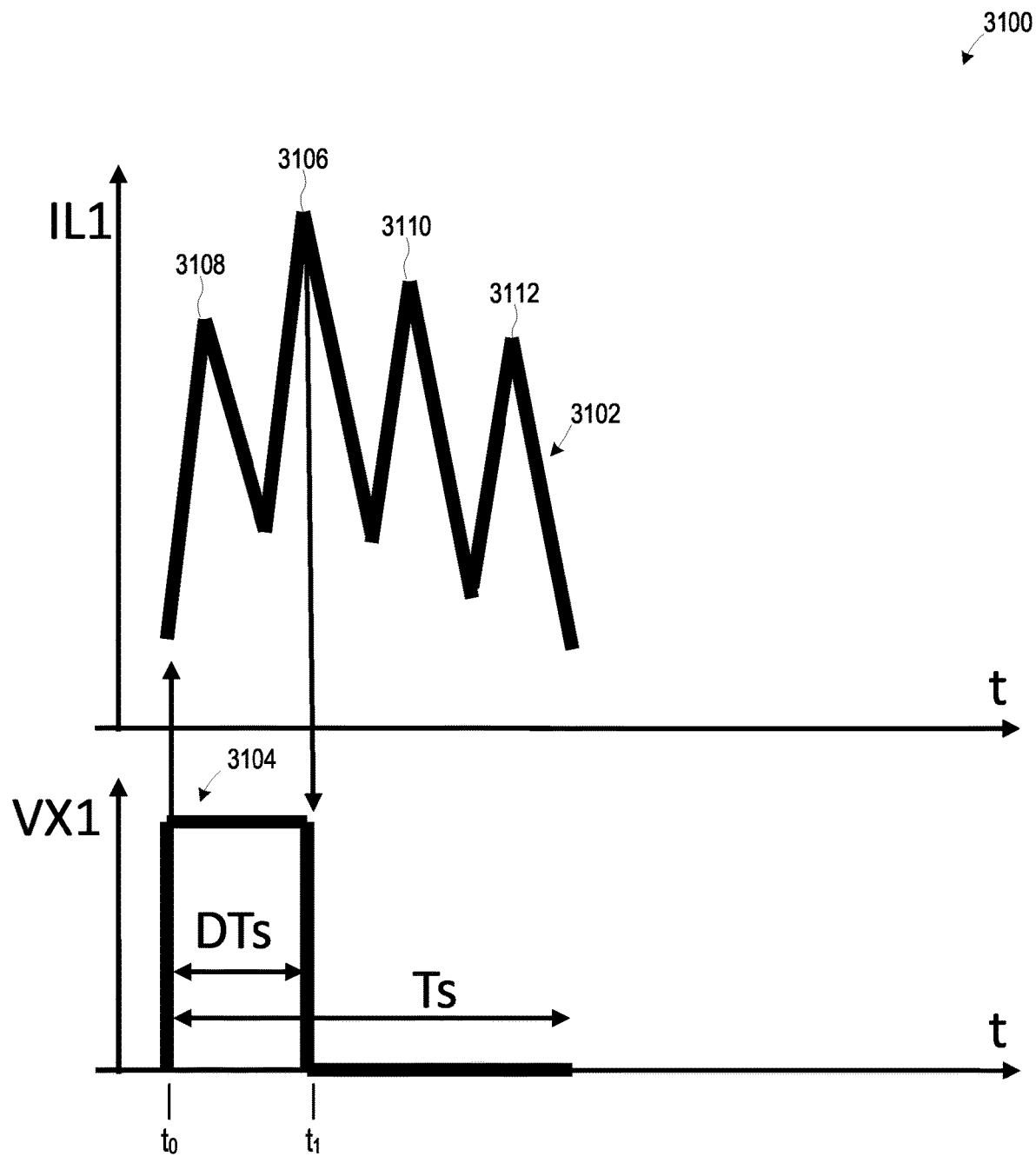
FIG. 31 is a graph illustrating simulated operation of one phase of a four-phase buck switching power converter including a coupled inductor having a coupling coefficient of 20.

For example, FIG. 31 is a graph 3100 illustrating simulated operation of one phase of a four-phase buck switching power converter including a coupled inductor having a coupling coefficient of 20, where input voltage is 12.0 volts, output voltage is 4.2 volts, and switching frequency is 800 Kilohertz (KHz). Curve 3102 represents current IL1 flowing through a winding of a first phase, and curve 3104 represents voltage of a switching node (VX1) of the first phase. The switching power converter has a switching period $T_s$, and the first phase is driven high for a time period $DT_s$ between time $t_0$ and time $t_1$, where D is switching power converter duty cycle. The switching power converter of this example uses peak current mode control, and the first phase is accordingly driven low at time $t_i$ in response to current IL1 reaching a peak value 3106. The high coupling coefficient causes to be additional large peak values 3108, 3110, and 3112 in current IL1 during switching period $T_s$. Peaks 3108, 3110, and 3112 may be considered "false" peaks from the standpoint of controlling the first phase, because the first phase should not change operating state in response to any of peaks 3108, 3110, and 3112. Instead, the first phase should change operating state, i.e. be driven low, only in response to "actual" peak 3106. Consequentially, the controller must be designed to not erroneously drive the first phase low in response to a false peak current value resulting from coupling of current through another winding. For example, the controller must be designed to not erroneously drive the first phase low in response to false peak value 3108, which occurs before actual peak value 3106. Difficulty in distinguishing false peak value 3108 from actual peak value 3106 increases with increasing value of the coupled inductor's coupling coefficient, because false peak value 3108 will be closer to actual peak value 3106 as the coupling coefficient value grows.

Accordingly, certain embodiments of controllers 2504, 2504', and 2604 are configured to cause switching stages 2502 or 2602 to switch in a manner which maintains controlled and stable power converter operation in applications where coupled inductors of the switching power converters have a high coupling coefficient, even when the high coupling coefficient causes significant interaction between winding current waveforms. For example, some embodiments of controllers 2504, 2504', and 2604 are configured to control switching of switching stages 2502 or 2602 in a stable manner in switching power converter applications where a coupled inductor of the power converter has a coupling coefficient of at least five. As another example, certain embodiments of controllers 2504, 2504', and 2604 are configured to control switching of switching stages 2502 or 2602 at least partially using a current mode control technique, including but not limited to a peak current mode control technique, an average current mode control technique, or a hysteretic current mode control technique, in an application where the coupled inductor of the power converter has a coupling coefficient of at least five. As yet another example, some embodiments of controllers 2504, 2504', and 2604 are configured to control switching of switching stages 2502 or 2602 in a manner which maintains controlled and stable operation when strong magnetic coupling between coupled inductor windings resulting from a high coupling efficient, e.g. a coupling coefficient of at least 5, restricts possible current adjustment between windings for a given duty cycle change in one switching period.

Combinations of Features

Features described above may be combined in various ways without departing from the scope hereof. The following examples illustrate some possible combinations.

(A1) A switching power converter assembly includes a coupled inductor including (1) first and second magnetic rails being separated from each other in a first direction, the first magnetic rail having a first cross-sectional area (A1) as seen when viewed in the first direction, (2) a plurality of connecting magnetic elements disposed between the first and second magnetic rails in the first direction, the plurality of connecting magnetic elements collectively having a second cross-sectional area (A2) as seen when viewed in the first direction, a ratio of A2/(A1−A2) being at least 1.5, and (3) a respective winding wound at least partially around each connecting magnetic element. The switching power converter assembly further includes a respective switching stage electrically coupled to each winding of the plurality of windings of the coupled inductor, where switching stage is configured to repeatedly switch a terminal of its respective winding between at least two different power nodes. The windings of the coupled inductor and the switching stages are collectively configured such that there is negative coupling between all windings of the coupled inductor.

(A2) In the switching power converter assembly denoted as (A1), each of the plurality of connecting magnetic elements of the coupled inductor may form a gap in the first direction.

(A3) In switching power converter assembly denoted as (A2), the first and second magnetic rails may be separated from each other in the first direction by a first separation distance, and each gap may have a respective thickness in the first direction that is at least two times smaller than the first separation distance (A4) In any one of the switching power converter assemblies denoted as (A1) through (A3), the plurality of connecting magnetic elements may be separated from each other in a second direction that is orthogonal to the first direction.

(A5) In any one of the switching power converter assemblies denoted as (A1) through (A4), the plurality of connecting magnetic elements may be disposed in a first row and in a second row.

(A6) In the switching power converter assembly denoted as (A5), the first row may be separated from the second row in a second direction that is orthogonal to the first direction.

(A7) In the switching power converter assembly denoted as (A6), within each of the first and second rows, the plurality of connecting magnetic elements may be separated from each other in a third direction that is orthogonal to each of the first direction and the second direction.

(A8) In any one of the switching power converter assemblies denoted as (A1) through (A7), each winding and its respective switching stage may collectively form a respective switching power converter.

(A9) In any one of the switching power converter assemblies denoted as (A1) through (A7), each winding and its respective switching stage may collectively form a respective phase of a multi-phase switching power converter.

(A10) Any one of the switching power converter assemblies denoted as (A1) through (A9) may further include a controller configured to control each switching stage.

(B1) A switching power converter assembly includes a coupled inductor including (1) first and second magnetic rails being separated from each other in a first direction, the first magnetic rail having a first cross-sectional area (A1) as seen when viewed in the first direction, (2) a plurality of connecting magnetic elements disposed between the first and second magnetic rails in the first direction, the plurality of connecting magnetic elements collectively having a second cross-sectional area (A2) as seen when viewed in the first direction, a ratio of A2/(A1−A2) being at least 1.5, and (3) a respective winding wound at least partially around each connecting magnetic element. The switching power converter assembly further includes (1) a respective switching stage electrically coupled to each winding of the plurality of windings of the coupled inductor, each switching stage being configured to repeatedly switch a terminal of its respective winding between at least two different power nodes, and (2) a controller. The controller is configured to control each switching stage so that each switching stage repeatedly switches the terminal of its respective winding between at least two different power nodes out-of-phase with each other switching stage.

(B2) In the switching power converter assembly denoted as (B1), each of the plurality of connecting magnetic elements of the coupled inductor may form a gap in the first direction.

(B3) In the switching power converter assembly denoted as (B2), the first and second magnetic rails may be separated from each other in the first direction by a first separation distance, and each gap may have a respective thickness in the first direction that is at least two times smaller than the first separation distance.

(B4) In any one of the switching power converter assemblies denoted as (B1) through (B3), the plurality of connecting magnetic elements may be separated from each other in a second direction that is orthogonal to the first direction.

(B5) In any one of the switching power converter assemblies denoted as (B1) through (B4), the plurality of connecting magnetic elements may be disposed in a first row and in a second row.

(B6) In the switching power converter assembly denoted as (B5), the first row may be separated from the second row in a second direction that is orthogonal to the first direction.

(B7) In the switching power converter assembly denoted as (B6), within each of the first and second rows, the plurality of connecting magnetic elements may be separated from each other in a third direction that is orthogonal to each of the first direction and the second direction.

(B8) In any one of the switching power converter assemblies denoted as (B1) through (B7), each winding and its respective switching stage may collectively form a respective switching power converter.

(B9) In any one of the switching power converter assemblies denoted as (B1) through (B7), at least two windings and respective switching stages may collectively form respective switching power converters that are electrically connected in a daisy chain fashion.

(B10) In any one of the switching power converter assemblies denoted as (B1) through (B9), each winding and its respective switching stage may collectively form a respective phase of a multi-phase switching power converter.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A switching power converter assembly, comprising:
    a coupled inductor including:
        first and second magnetic rails being separated from each other in a first direction, the first magnetic rail having a first cross-sectional area (A1) as seen when viewed in the first direction,
        a plurality of connecting magnetic elements disposed between the first and second magnetic rails in the first direction, the plurality of connecting magnetic elements collectively having a second cross-sectional area (A2) as seen when viewed in the first direction, a ratio of A1/(A1−A2) being at least 2.0, and
        a respective winding wound at least partially around each connecting magnetic element; and
    a respective switching stage electrically coupled to each winding of the plurality of windings of the coupled inductor, each switching stage being configured to repeatedly switch a terminal of its respective winding between at least two different power nodes,
    the windings of the coupled inductor and the switching stages being collectively configured such that there is negative coupling between all windings of the coupled inductor.

2. The switching power converter assembly of claim 1, wherein each of the plurality of connecting magnetic elements of the coupled inductor forms a gap in the first direction.

3. The switching power converter assembly of claim 2, wherein:
    the first and second magnetic rails are separated from each other in the first direction by a first separation distance; and
    each gap has a respective thickness in the first direction that is at least two times smaller than the first separation distance.

4. The switching power converter assembly of claim 1, wherein the plurality of connecting magnetic elements are separated from each other in a second direction that is orthogonal to the first direction.

5. The switching power converter assembly of claim 1, wherein the plurality of connecting magnetic elements are disposed in a first row and in a second row.

6. The switching power converter assembly of claim 5, wherein the first row is separated from the second row in a second direction that is orthogonal to the first direction.

7. The switching power converter assembly of claim 6, wherein within each of the first and second rows, the plurality of connecting magnetic elements are separated from each other in a third direction that is orthogonal to each of the first direction and the second direction.

8. The switching power converter assembly of claim 1, wherein each winding and its respective switching stage collectively form a respective switching power converter.

9. The switching power converter assembly of claim 1, wherein each winding and its respective switching stage collectively form a respective phase of a multi-phase switching power converter.

10. The switching power converter assembly of claim 1, further comprising a controller configured to control each switching stage.

11. A switching power converter assembly, comprising:
    a coupled inductor including:
        first and second magnetic rails being separated from each other in a first direction, the first magnetic rail having a first cross-sectional area (A1) as seen when viewed in the first direction,
        a plurality of connecting magnetic elements disposed between the first and second magnetic rails in the first direction, the plurality of connecting magnetic elements collectively having a second cross-sectional area (A2) as seen when viewed in the first direction, a ratio of A1/(A1−A2) being at least 2.0, and
        a respective winding wound at least partially around each connecting magnetic element;
    a respective switching stage electrically coupled to each winding of the plurality of windings of the coupled inductor, each switching stage being configured to repeatedly switch a terminal of its respective winding between at least two different power nodes; and
    a controller configured to control each switching stage so that each switching stage repeatedly switches the terminal of its respective winding between at least two different power nodes out-of-phase with each other switching stage.

12. The switching power converter assembly of claim 11, wherein each of the plurality of connecting magnetic elements of the coupled inductor forms a gap in the first direction.

13. The switching power converter assembly of claim 12, wherein:
    the first and second magnetic rails are separated from each other in the first direction by a first separation distance; and
    each gap has a respective thickness in the first direction that is at least two times smaller than the first separation distance.

14. The switching power converter assembly of claim 11, wherein the plurality of connecting magnetic elements are separated from each other in a second direction that is orthogonal to the first direction.

15. The switching power converter assembly of claim 11, wherein the plurality of connecting magnetic elements are disposed in a first row and in a second row.

16. The switching power converter assembly of claim 15, wherein the first row is separated from the second row in a second direction that is orthogonal to the first direction.

17. The switching power converter assembly of claim 16, wherein within each of the first and second rows, the plurality of connecting magnetic elements are separated from each other in a third direction that is orthogonal to each of the first direction and the second direction.

18. The switching power converter assembly of claim 11, wherein each winding and its respective switching stage collectively form a respective switching power converter.

19. The switching power converter assembly of claim 11, wherein at least two windings and respective switching stages collectively form respective switching power converters that are electrically connected in a daisy chain fashion.

20. The switching power converter assembly of claim 11, wherein each winding and its respective switching stage collectively form a respective phase of a multi-phase switching power converter.

* * * * *